United States Patent
McCusker et al.

(10) Patent No.: US 9,060,010 B1
(45) Date of Patent: Jun. 16, 2015

(54) INCORPORATING VIRTUAL NETWORK COMPUTING INTO A COCKPIT DISPLAY SYSTEM FOR CONTROLLING A NON-AIRCRAFT SYSTEM

(75) Inventors: Patrick D. McCusker, Walker, IA (US); Alan E. Siniff, Marion, IA (US); Sethu R. Rathinam, Cedar Rapids, IA (US); Frederick M. Rudolph, Marietta, GA (US); Patrick J. Cosgrove, Cedar Rapids, IA (US); Fred W. Powell, Jr., Waynesboro, VA (US); Richard E. Heinrich, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 541 days.

(21) Appl. No.: 13/459,204

(22) Filed: Apr. 29, 2012

(51) Int. Cl.
*G06F 15/16* (2006.01)
*G06F 17/00* (2006.01)
*H04L 29/08* (2006.01)
*G06F 3/14* (2006.01)

(52) U.S. Cl.
CPC .............. *H04L 67/12* (2013.01); *G06F 3/1423* (2013.01); *H04L 67/08* (2013.01)

(58) Field of Classification Search
CPC ........ H04L 67/08; H04L 67/12; G06F 3/1423
See application file for complete search history.

(56) References Cited

U.S. PATENT DOCUMENTS

| | | | |
|---|---|---|---|
| 7,401,116 B1 * | 7/2008 | Chalfin et al. ................. | 709/203 |
| 7,952,545 B2 * | 5/2011 | Benjamin et al. ............... | 345/87 |
| 8,125,351 B2 * | 2/2012 | Cabaret et al. ................. | 340/945 |
| 8,140,992 B2 * | 3/2012 | Jean et al. ...................... | 715/778 |
| 8,254,704 B2 * | 8/2012 | Lu et al. ......................... | 382/232 |
| 8,572,162 B2 * | 10/2013 | Gokaraju et al. .............. | 709/203 |
| 8,675,029 B2 * | 3/2014 | Benjamin et al. ............. | 345/690 |
| 8,725,318 B1 * | 5/2014 | McCusker ....................... | 701/3 |
| 8,731,060 B2 * | 5/2014 | Morard .................... | 375/240.16 |
| 2006/0224250 A1 * | 10/2006 | Callaghan ......................... | 700/1 |
| 2009/0045981 A1 * | 2/2009 | Jean et al. ...................... | 340/945 |
| 2009/0167774 A1 * | 7/2009 | Want et al. ..................... | 345/543 |

(Continued)

OTHER PUBLICATIONS

Richardson, Tristan. (Nov. 26, 2010). The RFB Protocol. Retrieved from http://www.realvnc.com/docs/rfbproto.pdf.*

(Continued)

*Primary Examiner* — Kristie Shingles
*Assistant Examiner* — Timothy Sowa
(74) *Attorney, Agent, or Firm* — Angel N. Gerdzhikov; Donna P. Suchy; Daniel M. Barbieri

(57) ABSTRACT

Systems and methods for incorporating virtual network computing ("VNC") into a cockpit display system ("CDS") and controlling an aircraft system and a remote system simultaneously with a VNC-incorporated CDS are disclosed. A system for incorporating VNC into the CDS is comprised of a VNC server of a remote system, at least one first user application ("UA"), a second UA, a pilot input device, and a CDS comprised of, in part, a processing module ("PM") configured with a method employing an aviation-industry standard protocol (e.g., ARINC 661) and a VNC protocol. A system for controlling the remote system aircraft system with a VNC-incorporated CDS is comprised with a VNC server of the aircraft system and/or the non-aircraft system, a UA, a pilot input device, a display surface format, and a CDS comprised of, in part, a PM configured with a method employing an aviation-industry standard protocol and a VNC protocol.

24 Claims, 21 Drawing Sheets

(56) References Cited

U.S. PATENT DOCUMENTS

| | | | |
|---|---|---|---|
| 2009/0184943 A1* | 7/2009 | Gross et al. | 345/175 |
| 2010/0106870 A1* | 4/2010 | Saugnac | 710/63 |
| 2010/0138476 A1* | 6/2010 | Gokaraju et al. | 709/203 |
| 2010/0162127 A1* | 6/2010 | Uchino | 715/740 |
| 2011/0179106 A1* | 7/2011 | Hulse et al. | 709/203 |
| 2012/0036445 A1* | 2/2012 | Ganille et al. | 715/738 |
| 2012/0244876 A1* | 9/2012 | Park et al. | 455/456.1 |
| 2013/0050271 A1* | 2/2013 | Kim et al. | 345/667 |

OTHER PUBLICATIONS

"Cockpit Display System Interfaces to User Systems", May 10, 2010, ARINC Specification 661-4, Aeronautical Radio, Inc., Annapolis, Maryland.

* cited by examiner

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 20 | 670 | 320 | 70 | 12 | 810 | 415 | 60 | 50 | 23 | 920 | 415 | 60 | 50 |
| 2 | 340 | 670 | 320 | 70 | 13 | 65 | 275 | 60 | 50 | 24 | 990 | 415 | 60 | 50 |
| 3 | 660 | 670 | 320 | 70 | 14 | 175 | 290 | 500 | 40 | 25 | 1060 | 415 | 60 | 50 |
| 4 | 980 | 670 | 320 | 70 | 15 | 665 | 275 | 60 | 50 | 26 | 1130 | 415 | 60 | 50 |
| 5 | 90 | 545 | 140 | 50 | 16 | 750 | 275 | 60 | 50 | 27 | 910 | 255 | 90 | 50 |
| 6 | 390 | 545 | 140 | 50 | 17 | 810 | 275 | 60 | 50 | 28 | 1010 | 255 | 90 | 50 |
| 7 | 690 | 545 | 140 | 50 | 18 | 65 | 135 | 60 | 50 | 29 | 1110 | 255 | 90 | 50 |
| 8 | 65 | 415 | 60 | 50 | 19 | 175 | 150 | 500 | 40 | 30 | 940 | 55 | 130 | 50 |
| 9 | 175 | 430 | 500 | 40 | 20 | 665 | 135 | 60 | 50 | 31 | 1080 | 55 | 130 | 50 |
| 10 | 665 | 415 | 60 | 50 | 21 | 750 | 135 | 60 | 50 | | | | | |
| 11 | 750 | 415 | 60 | 50 | 22 | 810 | 135 | 60 | 50 | | | | | |

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 80 | 835 | 320 | 70 | 12 | 870 | 580 | 60 | 50 | 23 | 980 | 580 | 60 | 50 |
| 2 | 400 | 835 | 320 | 70 | 13 | 125 | 440 | 60 | 50 | 24 | 1050 | 580 | 60 | 50 |
| 3 | 720 | 835 | 320 | 70 | 14 | 235 | 455 | 500 | 40 | 25 | 1120 | 580 | 60 | 50 |
| 4 | 1040 | 835 | 320 | 70 | 15 | 725 | 440 | 60 | 50 | 26 | 1190 | 580 | 60 | 50 |
| 5 | 150 | 710 | 140 | 50 | 16 | 810 | 440 | 60 | 50 | 27 | 970 | 420 | 90 | 50 |
| 6 | 450 | 710 | 140 | 50 | 17 | 870 | 440 | 60 | 50 | 28 | 1070 | 420 | 90 | 50 |
| 7 | 750 | 710 | 140 | 50 | 18 | 125 | 300 | 60 | 50 | 29 | 1170 | 420 | 90 | 50 |
| 8 | 125 | 580 | 60 | 50 | 19 | 235 | 315 | 500 | 40 | 30 | 1000 | 220 | 130 | 50 |
| 9 | 235 | 595 | 500 | 40 | 20 | 725 | 300 | 60 | 50 | 31 | 1140 | 220 | 130 | 50 |
| 10 | 725 | 580 | 60 | 50 | 21 | 810 | 300 | 60 | 50 | | | | | |
| 11 | 810 | 580 | 60 | 50 | 22 | 870 | 300 | 60 | 50 | | | | | |

BEFORE STARTING | (SQUAT2.SQUAT) RIFLE/GARFIELD COUNTY RGNL (RIL)
SQUAT TWO DEPARTURE (RNAV)   RIFLE, COLORADO

▸ FUEL QUANTITY.................................3,000 LBS

| Video | Audio | Environment | System |

Lights
(Full Cabin)  (Fwd)  (Aft)

Ceiling Control   10%   (−) ────○──────────── (+) (On)(Off)

Cabin Light Control
(On)(Off)  (On)(Off)

Valence Control   20%   (−) ──○──────────────── (+) (On)(Off)

Galley Lights Controls
(Galley)(Work)(Display)

Lunule Control   40%   (−) ──────○────────── (+) (On)(Off)

(Brightness)(Close)

RNG TO RES    0 KTS    SPEC RNG GS   0 NM/LB    TAKE-OFF RUNWAY 26: Climb to 10500 direct OMJIY, and via
TIME TO RES   0:00     SPEC RNG TAS  0 NM/LB    234 track to YIRDU, and via 216 track to SQUAT.

BEFORE STARTING | (SQUAT2.SQUAT) RIFLE/GARFIELD COUNTY RGNL (RIL)
SQUAT TWO DEPARTURE (RNAV)   RIFLE, COLORADO

▸ FUEL QUANTITY.................................3,000 LBS
▸ FUEL SYSTEM..........................................SET
▸ WEIGHT AND BALANCE..........................CHECKED
▸ PERFORMANCE DATA................CHECKED AND SET
▸ LNAV AND VNAV...................................CHECKED
▸ HYD DEMAND PUMPS.................AUTO (1-2), AUX
▸ ENGINE DISPLAY................................SELECTED
▸ BEACON LIGHTS...........................................ON

FUEL MGMT

TAKE-OFF MINIMUMS
Rwy 8: NA-ATC.
Rwy 26: Standard with minimum climb of 397' per NM to 9700.

DEPARTURE ROUTE DESCRIPTION

TAKE-OFF RUNWAY 26: Climb to 10500 direct OMJIY, and via
234 track to YIRDU, and via 216 track to SQUAT.

FIG. 6A

| Pos | X(o) | Y(o) | X(size) | Y(size) | Pos | X(o) | Y(o) | X(size) | Y(size) | Pos | X(o) | Y(o) | X(size) | Y(size) |
|---|---|---|---|---|---|---|---|---|---|---|---|---|---|---|
| 1 | 40 | 418 | 160 | 35 | 12 | 435 | 293 | 30 | 25 | 23 | 490 | 291 | 30 | 25 |
| 2 | 200 | 418 | 160 | 35 | 13 | 63 | 221 | 30 | 25 | 24 | 525 | 291 | 30 | 25 |
| 3 | 360 | 418 | 160 | 35 | 14 | 118 | 228 | 250 | 20 | 25 | 560 | 291 | 30 | 25 |
| 4 | 520 | 418 | 160 | 35 | 15 | 363 | 221 | 30 | 25 | 26 | 595 | 291 | 30 | 25 |
| 5 | 75 | 356 | 70 | 25 | 16 | 405 | 221 | 30 | 25 | 27 | 485 | 211 | 45 | 25 |
| 6 | 225 | 356 | 70 | 25 | 17 | 435 | 221 | 30 | 25 | 28 | 535 | 211 | 45 | 25 |
| 7 | 375 | 356 | 70 | 25 | 18 | 63 | 151 | 30 | 25 | 29 | 585 | 211 | 45 | 25 |
| 8 | 63 | 208 | 30 | 25 | 19 | 118 | 158 | 250 | 20 | 30 | 500 | 111 | 65 | 25 |
| 9 | 118 | 291 | 250 | 20 | 20 | 363 | 151 | 30 | 25 | 31 | 570 | 111 | 65 | 25 |
| 10 | 363 | 293 | 30 | 25 | 21 | 405 | 151 | 30 | 25 | | | | | |
| 11 | 405 | 293 | 30 | 25 | 22 | 435 | 151 | 30 | 25 | | | | | |

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 125 | 635 | 90 | 90 | 10 | 809 | 485 | 90 | 90 | 19 | 638 | 185 | 90 | 90 |
| 2 | 296 | 635 | 90 | 90 | 11 | 125 | 335 | 90 | 90 | 20 | 809 | 185 | 90 | 90 |
| 3 | 467 | 635 | 90 | 90 | 12 | 296 | 335 | 90 | 90 | 21 | 209 | 25 | 90 | 90 |
| 4 | 638 | 635 | 90 | 90 | 13 | 467 | 335 | 90 | 90 | 22 | 381 | 25 | 90 | 90 |
| 5 | 809 | 635 | 90 | 90 | 14 | 638 | 335 | 90 | 90 | 23 | 553 | 25 | 90 | 90 |
| 6 | 125 | 485 | 90 | 90 | 15 | 809 | 335 | 90 | 90 | 24 | 725 | 25 | 90 | 90 |
| 7 | 296 | 485 | 90 | 90 | 16 | 125 | 185 | 90 | 90 | 25 | 0 | 758 | 1024 | 20 |
| 8 | 467 | 485 | 90 | 90 | 17 | 296 | 185 | 90 | 90 | 26 | 0 | 140 | 1024 | 20 |
| 9 | 638 | 485 | 90 | 90 | 18 | 467 | 185 | 90 | 90 | | | | | |

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 399 | 908 | 90 | 90 | 10 | 570 | 566 | 90 | 90 | 19 | 741 | 224 | 90 | 90 |
| 2 | 570 | 908 | 90 | 90 | 11 | 741 | 566 | 90 | 90 | 20 | 912 | 224 | 90 | 90 |
| 3 | 741 | 908 | 90 | 90 | 12 | 912 | 566 | 90 | 90 | 21 | 399 | 38 | 90 | 90 |
| 4 | 912 | 908 | 90 | 90 | 13 | 399 | 395 | 90 | 90 | 22 | 570 | 38 | 90 | 90 |
| 5 | 399 | 737 | 90 | 90 | 14 | 570 | 395 | 90 | 90 | 23 | 741 | 38 | 90 | 90 |
| 6 | 570 | 737 | 90 | 90 | 15 | 741 | 395 | 90 | 90 | 24 | 912 | 38 | 90 | 90 |
| 7 | 741 | 737 | 90 | 90 | 16 | 912 | 395 | 90 | 90 | 25 | 0 | 1027 | 748 | 20 |
| 8 | 912 | 737 | 90 | 90 | 17 | 399 | 224 | 90 | 90 | 26 | 0 | 166 | 748 | 20 |
| 9 | 399 | 566 | 90 | 90 | 18 | 570 | 224 | 90 | 90 | | | | | |

| Pos | X(ref) | Y(ref) | X(size) | Y(size) | Pos | X(ref) | Y(ref) | X(size) | Y(size) | Pos | X(ref) | Y(ref) | X(size) | Y(size) |
|---|---|---|---|---|---|---|---|---|---|---|---|---|---|---|
| 1 | 313 | 776 | 90 | 90 | 10 | 997 | 626 | 90 | 90 | 19 | 826 | 326 | 90 | 90 |
| 2 | 484 | 776 | 90 | 90 | 11 | 313 | 476 | 90 | 90 | 20 | 997 | 326 | 90 | 90 |
| 3 | 655 | 776 | 90 | 90 | 12 | 484 | 476 | 90 | 90 | 21 | 397 | 166 | 90 | 90 |
| 4 | 826 | 776 | 90 | 90 | 13 | 655 | 476 | 90 | 90 | 22 | 569 | 166 | 90 | 90 |
| 5 | 997 | 776 | 90 | 90 | 14 | 826 | 476 | 90 | 90 | 23 | 741 | 166 | 90 | 90 |
| 6 | 313 | 626 | 90 | 90 | 15 | 997 | 476 | 90 | 90 | 24 | 913 | 166 | 90 | 90 |
| 7 | 484 | 626 | 90 | 90 | 16 | 313 | 326 | 90 | 90 | 25 | 188 | 899 | 1024 | 20 |
| 8 | 655 | 626 | 90 | 90 | 17 | 484 | 326 | 90 | 90 | 26 | 188 | 281 | 1024 | 20 |
| 9 | 826 | 626 | 90 | 90 | 18 | 655 | 326 | 90 | 90 | | | | | |

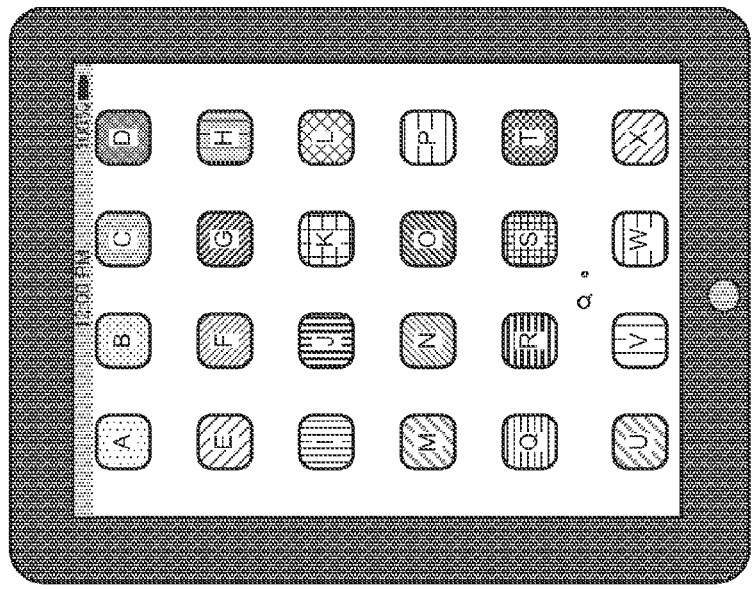
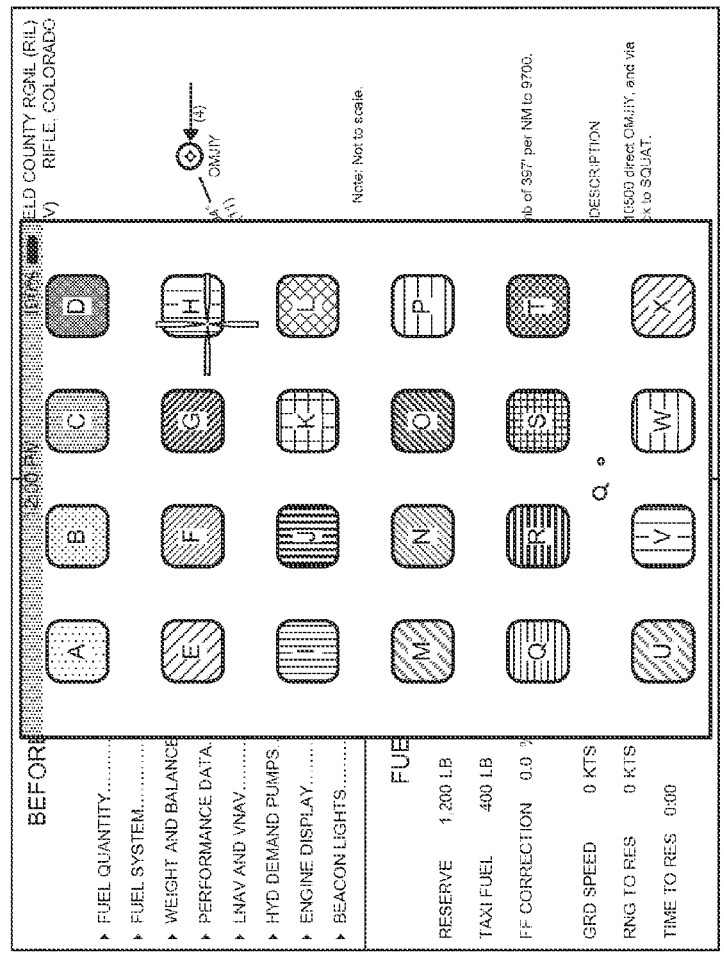
FIG. 10A
FIG. 10B

INCORPORATING VIRTUAL NETWORK COMPUTING INTO A COCKPIT DISPLAY SYSTEM FOR CONTROLLING A NON-AIRCRAFT SYSTEM

BACKGROUND OF THE INVENTION

1. Field of the Invention

This invention pertains generally to the field of aircraft display units that provide information to the pilot or flight crew of an aircraft.

2. Description of the Related Art

Hardware and software design standards for the aviation industry have been published by the Radio Technical Commission for Aeronautics ("RTCA"). The RTCA has published DO-254 entitled "Design Assurance Guidance for Airborne Electronic Hardware" and DO-178B entitled "Software Considerations in Airborne Systems and Equipment Certification." Each publication distinguishes between simple and complex electronic hardware, recognizes five classes of failure conditions, and provides guidance for each hardware and/or software design assurance level ("DAL") associated with a given failure condition.

Level A is considered the highest DAL and corresponds to a "catastrophic" failure condition of which failure of the hardware and/or software may cause a loss of the aircraft. Level B corresponds to a "hazardous" failure condition of which failure may cause a large negative impact on safety or performance, reduces the ability of the crew to operate the aircraft due to physical distress or a higher workload, or causes serious or fatal injuries among the passengers. Level C corresponds to a "major" failure condition of which failure may be significant but have a lesser impact than a hazardous failure or significantly increases crew workload. Level D corresponds to a "minor" failure condition of which failure may be noticeable but have a lesser impact than a major failure. Level E corresponds to a "no effect" failure condition of which failure has no impact on safety, aircraft operation, or crew workload.

To meet the higher DALs, many standards have been developed. With respect to presenting the pilot with flight-related information and aircraft-system information and/or allowing the pilot to control systems installed somewhere on the aircraft by interacting with a cockpit display unit, data exchange protocols have been published by Aeronautical Radio, Incorporated ("ARINC") in ARINC Specification 661 entitled "Cockpit Display System Interfaces to User Systems" ("ARINC 661"), an aviation industry standard known to those skilled in the art.

Although ARINC 661 could be employed for all aircraft systems, ARINC 661 may be considered too demanding for a manufacturer of an aircraft system because of the strict protocols stated therein. For example, information about real time parameter(s) of an aircraft system may be presented to the pilot and/or facilitate pilot control of the system; in order to do so, however, the strict protocols of the ARINC 661 have to be followed.

There may be occasions when an aircraft system does not need to meet higher DALs. For example, a cabin control system could be employed in an aircraft, but failure of such system may have no impact on safety, aircraft operation, and/or crew workload; instead, failure may mean a loss of passenger comfort. In this instance, although it may be beneficial to provide information about and/or control of the cabin control system to the pilot in the cockpit, it may not be beneficial and/or cost-effective for the manufacturer of the cabin control system to employ the strict protocols of ARINC 661 when such a system does not have to meet higher DALs.

U.S. patent application Ser. No. 13/235,614 of McCusker entitled "Systems and Methods for Incorporating Virtual Network Computing into a Cockpit Display System and Controlling a Remote Aircraft System with the VNC-Incorporated CDS" (collectively, "McCusker") disclosed systems and methods for incorporating virtual network computing ("VNC") into a cockpit display system ("CDS") and controlling remote aircraft systems with a VNC-incorporated CDS. While McCusker disclosed the use of VNC for remote systems that are installed in aircraft, the use of VNC for remote systems that are not installed in aircraft such as portable electronic devices such as tablets and laptops and/or non-portable external devices were not disclosed.

BRIEF SUMMARY OF THE INVENTION

Embodiments of the inventive concepts disclosed herein are directed to (1) a system and a method for incorporating virtual network computing ("VNC") into a cockpit display system ("CDS") and (2) a system and a method for controlling a remote non-aircraft system from the cockpit with the VNC-incorporated CDS.

In one embodiment, a system is disclosed for incorporating VNC into a CDS. The system is comprised with a VNC server of a non-aircraft system, at least one first user application ("UA"), a second UA, a pilot input device, and a cockpit display system comprised of a processing module ("PM"). As embodied herein, a pixel data set is established by the PM, where the pixel data set is representative of a first image comprised of one or more non-VNC widgets based upon widget data provided by one or more first UAs. Then, input data corresponding to a request to display a second image is received by the PM from a pilot input device. In response, data representative of the request is generated in a first protocol (e.g., ARINC 661 protocol) by the PM and sent to the second UA. In response to the request data, data representative of a request for remote frame buffer ("RFB") data of the second image is generated in a second protocol (e.g., VNC protocol) by a VNC client of the second UA and sent to the VNC server. In response to the request for RFB data, data representative of the RFB is generated in the second protocol by the VNC client and sent to the VNC server of the second UA. In response to the RFB data, VNC image widget data is generated from the RFB data and sent to the PM by the second UA. Then, the VNC image widget data is incorporated into the pixel data set.

In another embodiment, a method for incorporating VNC into a CDS is disclosed. When configured with this method, the PM may perform the actions discussed in the preceding paragraph.

In another embodiment, a system is disclosed for controlling a non-aircraft system from the cockpit with the VNC incorporated. The system is comprised with a VNC server of a non-aircraft system, a UA, a pilot input device, a predefined display surface format comprised of one or more layers to which one or more non-VNC widgets are assigned and one or more layers to which one or more VNC widgets are assigned, and a cockpit display system comprised of a PM. As embodied herein, a pixel data set representative of a first image comprised of at least one VNC image widget is established by the PM. Then, input data corresponding to an event of the VNC image and location is received by the PM from a pilot input device. In response, data representative of the location and a widget event state is generated in a first protocol by the PM and sent to the UA. Then, data representative of a notice and request for RFB data of the second image is generated in a second protocol by a VNC client of the UA and sent to the VNC server. In response to the request for RFB data, data representative of the RFB is generated in the second protocol by the VNC client and sent to the VNC server of the UA. In response to the RFB data, VNC image widget data is generated from the RFB data and sent to the PM by the UA. Then, the VNC image widget data is incorporated into the pixel data set. As embodied herein, the system disclosed in this paragraph may be included with the system disclosed above for incorporating VNC into a CDS.

In another embodiment, a method for controlling a non-aircraft system from the cockpit with the VNC-incorporated is disclosed. When configured with this method, the PM may perform the actions discussed in the preceding paragraph.

BRIEF DESCRIPTION OF THE DRAWINGS

FIG. 5C depicts a change to the local image corresponding to the change of FIG. 5B.

FIG. 6A depicts the exemplary remote image of FIG. 3A simultaneously with the exemplary local image of FIG. 2A when applied to the exemplary display surface format of FIG. 2D.

FIG. 10A depicts a selection made on a first local image shown on a local display unit.

FIG. 10B depicts a first change to the remote image corresponding to the selection of FIG. 10A.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
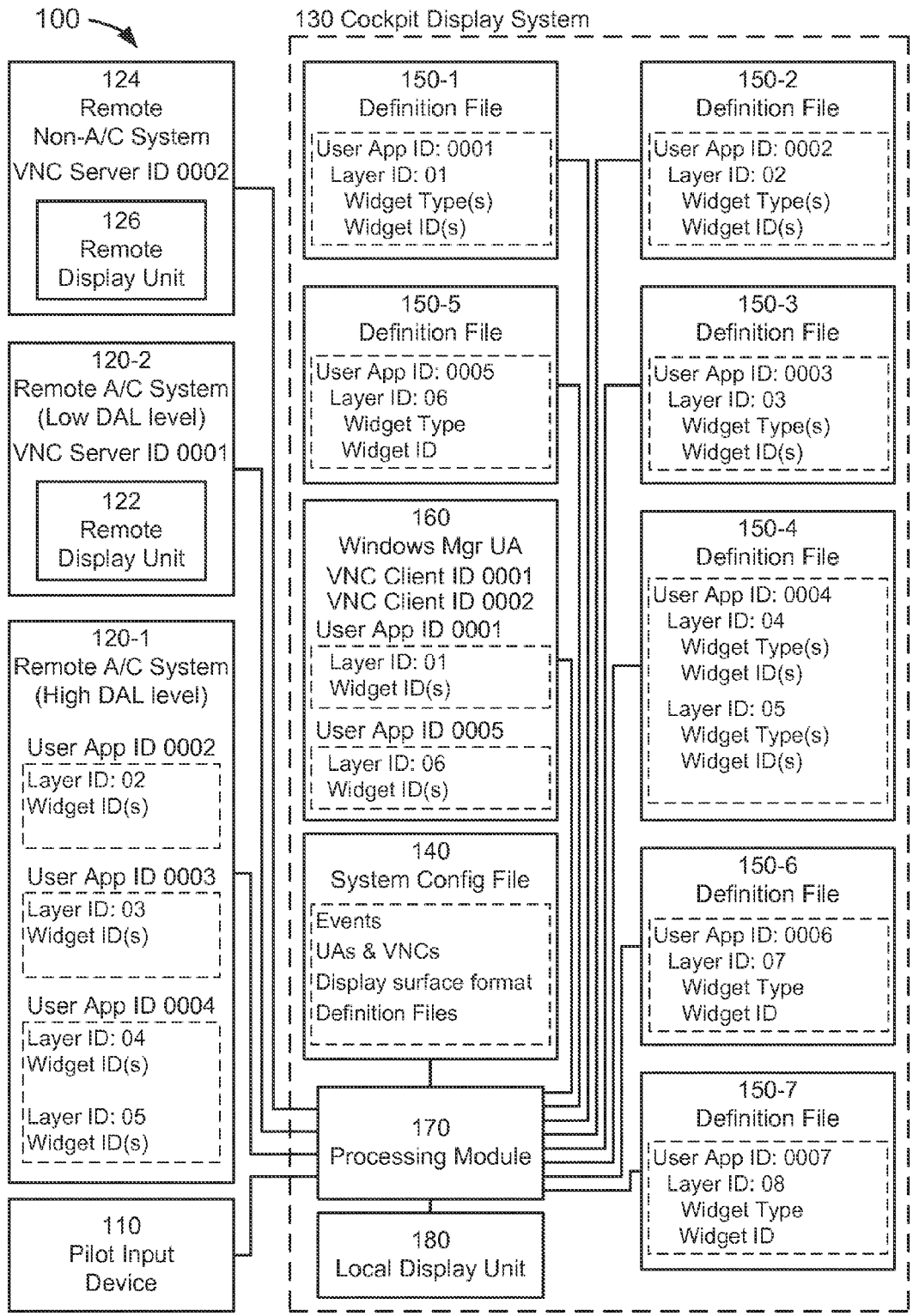
FIG. 1 depicts a block diagram of a windows management and presentation system.

FIG. 1 depicts a block diagram of a windows management and presentation system (collectively, "presentation system") 100 suitable for implementation of the techniques described herein, wherein information generated by system employing hardware and/or software certified to a relatively low design assurance level ("DAL") may be presented on the same display surface of at least one display unit of a system employing hardware and/or software certified to a higher DAL. The presentation system 100 of an embodiment of FIG. 1 includes a pilot input device 110, at least one remote aircraft system 120, at least one remote non-aircraft system 124, and a cockpit display system ("CDS") 130.

In an embodiment of FIG. 1, the pilot input device 110 could comprise any source for facilitating a pilot's interaction with graphical user interfaces ("GUI") referred to as interactive widgets that are displayed on the surface of a local display unit 180 (some non-interactive widgets could also be displayed). The pilot input device 110 may include any device that allows for the manual selection of a widgets and/or entry of data. Such devices could include, but are not limited to, a tactile device (e.g., keyboard, control display unit, cursor control device, touch screen device, etc. . . . ) and/or speech recognition systems. A local display unit 180 could be included as a pilot input device 110 if it is able to receive pilot input (e.g., touch screen display). As embodied herein, the pilot input device 110 may provide input representative of a pilot's selection to a processing module ("PM") 170. It should be noted that, although the discussion herein is drawn to the term "pilot," the definition of such term should not be limited to flight personnel but should include ground personnel and/or any viewer of the local display unit 180.

In an embodiment of FIG. 1, remote aircraft systems 120 could be comprised of any system installed in an aircraft in which a user application ("UA") and/or a virtual network computing ("VNC") server is installed; remote non-aircraft system 124 could be comprised of any system not installed in an aircraft but has a VNC server installed. Types of remote aircraft systems 120 may include, but are not limited to, air conditioning, auto flight, communications, electrical power, cockpit/cabin systems, fire protection, flight controls, fuel, hydraulic power, ice and rain protection, instruments, landing gear, lights, navigation, oxygen, pneumatic, vacuum, waste/water, central maintenance system, auxiliary power unit, propellers, main rotor, main rotor drive, tail rotor, tail rotor drive, rotors flight control, propeller/rotor systems, and powerplant systems; types of a remote non-aircraft system 124 may include, but are not limited to, system(s) employed by a flight operations management department and by an aircraft technical operations department (e.g., an aircraft maintenance department). As embodied herein, the contents of each UA and/or each VNC server may be read by the PM 170 when the CDS 130 is initialized.

As embodied herein, the UA of remote aircraft systems 120 and those items discussed below such as a system configuration file ("CF") 140, a plurality of definition files (DFs, or singularly "DF") 150, a windows manager UA ("WMUA") 160, and/or the PM 170 may be software components stored in a digital memory storage device or PM-readable media (i.e., media readable by the PM 170) including, but not limited to, a plurality of types of RAMs, a plurality of types of ROM, CD, DVD, hard disk drive, diskette, solid-state memory, PCMCIA or PC Card, secure digital cards, compact flash cards, and/or memory currently in development that is suitable for performing the embodiments disclosed herein. Although the system CF 140, the DFs 150, and the WMUA 160 are illustrated as being internal to the CDS 130, the storage devices storing any one of these may be external to the CDS 130 and used as an internal component of any other system of the aircraft.

Remote aircraft system 120-1 could be representative of one or more remote aircraft systems owning one or more UAs and layers therein, where each layer may be considered as the highest level entity known by each UA. Remote aircraft system 120-2 could be representative of one or more remote aircraft systems owning one or more VNC servers. Remote non-aircraft system(s) 124 could be representative of one or more remote non-aircraft systems owning one or more VNC servers. Referring to FIG. 1, remote aircraft system 120-1 owns UA 0002 through UA0004 and layers 02 through 05, remote aircraft system 120-2 owns a VNC server 0001, and remote non-aircraft system 124 owns a VNC server 0002; the CDS 130 owns WMUA 160, layers 01 and 06, VNC client 0001, and VNC client 0002. For the purpose of discussion herein, remote aircraft system 120-1 will be assumed to require a relatively high DAL certification, remote aircraft system 120-2 will be assumed to require a lower DAL certification, and remote non-aircraft system 124 will be assumed to require no DAL certification; DALs are discussed in detail below.

The UAs of remote aircraft system 120-1 may facilitate the dynamic exchange of blocks of data between the CDS 130 and remote aircraft systems 120-1, where exchange protocols have been published by Aeronautical Radio, Incorporated ("ARINC") in ARINC Specification 661 entitled "Cockpit Display System Interfaces to User Systems" ("ARINC 661"), an aviation industry standard known to those skilled in the art which is hereby and herein incorporated by reference in its entirety. In one direction of the dynamic exchange, UAs 0002 through 0004 of remote aircraft system 120-1 may send real-time parameters measured and/or calculated by remote aircraft system 120-1 to the CDS 130 as updated runtime parameters of one or more widgets of layers 0002 through 0004; also, UAs 0002 through 0004 may request changes to one or more layer properties of layers 0002 through 0004 such as, but not limited to, changes to layer visibility.

In the other direction of the dynamic exchange, the CDS 130 may send notices of real-time events (e.g., events initiated by interactions between a pilot input device 110 and widgets) to UAs 0002 through 0004 of remote aircraft system 120-1 as well as send notices of layer property changes such as, but not limited to, changes to layer activation. As embodied herein, remote aircraft system 120-1 may send widget parameters and layer property requests to the PM 170 and may receive widget events and layer properties from the PM 170.

Remote aircraft system 120-2 could be comprised of any system installed in an aircraft in which a VNC server is installed, and remote aircraft non-system 124 could be comprised of any system not installed in an aircraft in which a VNC server is installed; remote display units 122 and 126 could be included in the remote aircraft system 120-2 and remote non-aircraft system 124, respectively. Each VNC server is part of a broader VNC system which, in addition to the VNC server, may be comprised of a VNC client and a VNC protocol employed in the exchange of data between the VNC server and the VNC client. The VNC server may be an application that, when employed, permits the remote images of the remote display units 122 and 126 to be viewed on another display unit, e.g., the local display unit 180, by sharing the contents of a frame buffer of the remote display unit 122 (the remote frame buffer ("RFB")) and/or the RFB of the remote display unit 126. The VNC client may be an application which allows the remote image to be viewed and/or controlled remotely. Personnel located in the cockpit of an aircraft may interact with a "VNC image widget" presented on the surface of the local display unit 180 to control a remote aircraft system 120-2 and/or a remote non-aircraft system 124 from the cockpit just as personnel interact with the remote image presented on the surface of the remote display unit 122 and/or the remote display unit 126. For the purpose of illustration and not limitation, the discussions herein of the remote aircraft system 120-2 and the remote non-aircraft system 124 will be drawn toward a cabin system and an iPad® developed by Apple, Inc., respectively.

Referring to FIG. 1, the VNC protocol may be a protocol which facilitates the exchange of data between the CDS 130 and the remote aircraft system 120-2 and/or the remote non-aircraft system 124; one non-exclusive example of a VNC protocol is an RFB protocol. The VNC client 0001 and/or VNC client 0002 may send client-to-server messages of real-time event occurrences to the VNC server 0001 and/or VNC server 0002, respectively, such as non-exclusive requests for updated RFB data and location and state data of a real-time event. In response, the VNC server 0001 and/or VNC server 0002 may send server-to-client messages to the VNC client 0001 and/or VNC client 0002 such as non-exclusive responses of updated RFB data. As embodied herein, the remote aircraft system 120-2 and/or remote non-aircraft system 124 may send server-to-client messages to the PM 170 and receive client-to-server messages from the PM 170.

In an embodiment of FIG. 1, the CDS 130 may be comprised of many components including the system CF 140, the plurality of DFs 150, the WMUA 160, the PM 170, and/or the local display unit 180. The system CF 140 may be used to configure the initial settings for the CDS 130. The system CF 140 may be comprised of instructions for establishing a communication link(s) with one or more pilot input devices 110 for the subsequent receiving of input from a pilot's selection through widget interaction, where such input may trigger the PM 170 to recognize an event associated with the pilot's selection. Also, the system CF 140 may include instructions or information related to the UAs of remote aircraft system 120-1, the VNC servers of remote aircraft system 120-2 and remote non-aircraft system 124, the UAs and the VNC clients stored in the WMUA 160, the layers owned by both remote aircraft system 120-1 and the CDS 130, the configuration of a display surface format associated with the location of window(s) and the assignment of layer(s) to each window, and the loading and interpreting of the plurality of DFs 150. As embodied herein, the contents of the system CF 140 providing the initial settings for the CDS 130 may be loaded and interpreted by the PM 170 to begin an initialization process of the CDS 130.

In an embodiment of FIG. 1, DFs 150 could describe a hierarchical structure of widgets assigned to layers, where the widget could be considered as a building block. Because the types and/or identification of widgets between layers could vastly differ, no specific widget type and/or identification are shown in FIG. 1 (including those shown in the remote aircraft system 120-1). Each widget could be defined by a set of parameters that control the graphical and/or interactive characteristics of that widget, where each parameter could be fixed or modified during runtime, i.e., a runtime parameter. Examples of widget parameters include, but are not limited to, visibility and enablement parameters. Also, each widget could have a graphical look that represents how the object will appear when it is drawn on the display surface of the local display unit 180. As stated above, an interactive widget could be a GUI which provides a means for the pilot to interact with the CDS 130.

A widget could be grouped into one or more categories such as, but not limited to, the following: a container or logical widget (e.g., basic container, mutually exclusive container, radio box, etc. . . . ), a graphical representation widget (e.g., edit box text, graphical primitive ("GP") line, GP rectangle, label, push button, toggle button, etc. . . . ), a text string widget (edit box text, label, push button, toggle button, etc. . . . ), an interactive widget (e.g., edit box text, push button, toggle button, etc. . . . ), a map management widget (e.g., map grid, horizontal map, horizontal map source, horizontal map item list, etc. . . . ), a dynamic motion widget (e.g., GP line, GP rectangle, label, etc. . . . ), a utility widget (e.g., connector, cursor reference, etc. . . . ), and a UA validation widget (e.g., basic container, edit box text, horizontal map, horizontal map source, mutually exclusive container, push button, radio box, toggle button, etc. . . . ).

As embodied herein, each VNC image widget could be comprised of an image created from the RFB data request and received by the VNC clients 0001 and/or 0002. For widget type, DF150-5 could specify a memory size and/or location for storing RFB image data when received by the VNC clients 0001 and/or 0002 and forward to the WMUA 160. As discussed below, a manufacturer and/or end-user may configure the VNC image widget. The VNC image widget could be the same size as the remote image and/or a scaling factor could be applied. Also, part of the RFB data (e.g. parts of the top, bottom, and/or sides) could be truncated. The VNC widget could also be comprised of widget parameters such as, visibility and enablement as stated in ARINC 661. The VNC image widget may not be interactive. That is, it may be an image only because the RFB data represents image data when the exchange between the VNC servers 0001 and/or 0002 and the VNC clients 0001 and/or 0002, respectively, takes place; however, when visible and enabled, the pilot may nevertheless treat the VNC image widget as being interactive when he or she selects the VNC image widget. As embodied herein, the location of the pilot's selection may be captured as surface (i.e., screen) coordinates by the VNC clients 0001 and/or 0002 and translated into corresponding remote image coordinates that are sent to the VNC servers 0001 and/or 0002, respectively.

Each DF 150 could be comprised of a single layer or a grouping of layers, where each layer could be comprised of a single widget or a grouping of widgets. Referring to FIG. 1, DFs 150-1, 150-2, 150-3, 150-5, 150-6, and 150-7 are comprised of single layers 01, 02, 03, 06, 07, and 08, respectively. DF 150-4 is comprised of a grouping of layers 04 and 05. As discussed above, each DF 150 and each layer included therein could be owned by one UA. Referring to FIG. 1, DFs 150-1 and 150-5 through 150-7 are owned by WMUA 160, and DFs 150-2 through 150-4 are owned by UAs 0002 through 0004, respectively. As embodied herein, the contents of the DFs 150 may be read by the PM 170 when the CDS 130 is initialized.

In an embodiment of FIG. 1, the WMUA 160 is representative of one or more UAs and/or one or more VNC clients that could be owned by the CDS 130. Similar to the UAs of each remote aircraft system 120-1, the PM 170 may send notices of real-time event occurrences to the WMUA 160 and layer property changes such as layer activation to layer 01 and/or layer 06. Responding to such notices, the WMUA 160 may update the runtime parameters of one or more widgets owned by layer(s) and send them to the PM 170 as well as requests for changes to one or more layer properties such as the layer visibility and activity of layer 01 and/or layer 06. It should be noted that, although the VNC clients 0001 and 0002 are shown in FIG. 1 as being included but segregated in the WMUA 160, the VNC clients 0001 and/or 0002 may be treated separately from UAs 0001 and 0005 because the VNC clients 0001 and/or 0002 may employ VNC protocol whereas UAs 0001 and 0005 may employ ARINC 661 protocol. As embodied herein, the contents of the WMUA 160 may be read by the PM 170 when the CDS 130 is initialized.

In an embodiment of FIG. 1, the PM 170 may be any electronic data processing unit or combination of electronic data units which execute software or source code stored, permanently or temporarily, in a digital memory storage device as discussed above. The PM 170 may be driven by the execution of software or source code containing algorithms developed for the specific functions embodied herein. Common examples of electronic data processing units are microprocessors, Digital Signal Processors, Programmable Logic Devices, Programmable Gate Arrays, and signal generators; however, for the embodiments herein, the term generator is not limited to such processing units and its meaning is not intended to be construed narrowly. For instance, a processor could also consist of more than one electronic data processing units. As embodied herein, the PM 170 could be a processor(s) used by or in conjunction with any other system of the aircraft.

The PM 170 may be programmed or configured to receive data from the pilot input device 110, from the UAs 0002 through 0004 of remote aircraft system 120-1, from the VNC servers 0001 and/or 0002 of remote aircraft system 120-2 and remote non-aircraft system 124, respectively, from the system CF 140, from the DFs 150, and/or from the WMUA 160. The PM 170 may be programmed to send data to the UAs 0002 through 0004 of remote aircraft system 120-1, to the VNC servers 0001 and/or 0002 of remote aircraft system 120-2 and remote non-aircraft system 124, respectively, to the WMUA 160, and/or to the local display unit 180. The PM 170 may be programmed to execute the methods embodied herein and discussed in detail below.

As embodied herein, the terms "programmed" and "configured" are synonymous with respect to the execution of software or source code developed for the specific functions and methods embodied herein. The PM 170 may be electronically coupled to systems and/or sources to facilitate the receipt of data; as embodied herein, operatively coupled may be considered as interchangeable with electronically coupled. It is not necessary that a direct connection be made; instead, such receipt of input data and the providing of output data could be provided through a data bus or through a wireless network.

In an embodiment of FIG. 1, the local display unit 180 comprises any unit having a display surface on which widgets may be presented to the pilot. The local display unit 180 could be, but is not limited to, a Primary Flight Director, Navigation Display, Head-Up Display, Head-Down Display, Multi-Purpose Control Display Unit, Engine Indicating and Crew Alerting System, Electronic Centralized Aircraft Monitor, Multi-Function Display, Side Displays, and Data Link Control Display Unit. As embodied herein, the local display unit 180 may receive image data sent by the PM 170.

The PM 170 may be programmed to own and manage one or more windows displayed on the surface of a display unit, where each window may be defined as a physical demarcation of space on the surface of the local display unit 180. Such physical demarcation information may have been provided in the system CF 140 and read by the PM 170. The visibility of each window could be managed by the PM 170, wherein the appearance of widgets in each window may be based upon both layer properties and widget parameters.

FIGS. 2A through 2D illustrate the local display unit 180 and three exemplary display surface formats that may be used to depict one local image on the surface of the local display unit 180, where the physical demarcation of space has created one or more windows comprised of one or more layers. FIGS. 2A through 2D are provided for the purpose of illustration and not of limitation.

Figure 2A:
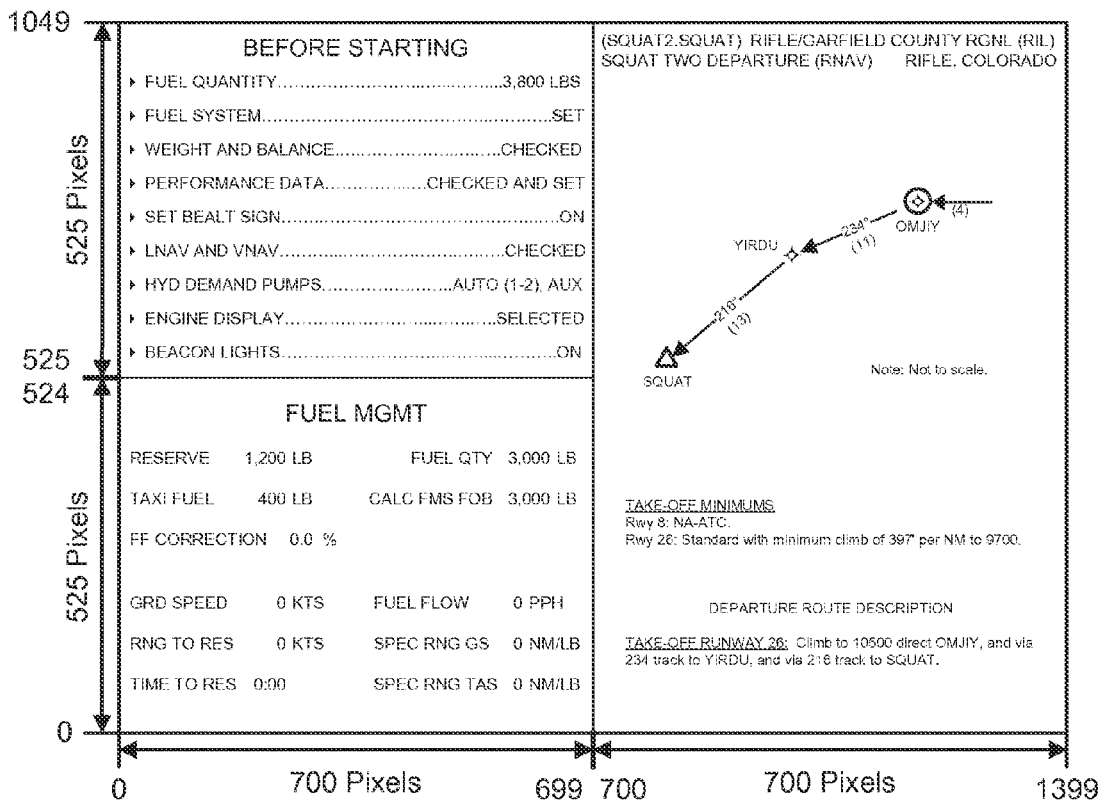
FIG. 2A depicts a local display unit and an exemplary local image presented thereon.

Referring to FIG. 2A, the local display unit 180 has a surface area of 1400 by 1050 pixels. On the surface of the display unit, a "BEFORE STARTING" checklist comprised of at least non-VNC widget is depicted on the upper left half, a "FUEL MGMT" panel comprised of at least non-VNC widget is depicted on the lower left half, and a departure procedure comprised of at least non-VNC widget and identified as "SQUAT TWO DEPARTURE" is depicted on the right half. It should be noted that, although the discussion herein will be drawn to the use of pixels as a unit of measurement, the use of another unit(s) such as millimeters may be used in place of pixels or along with pixels, where the latter may require the use of a conversion factor.

Figure 2B:
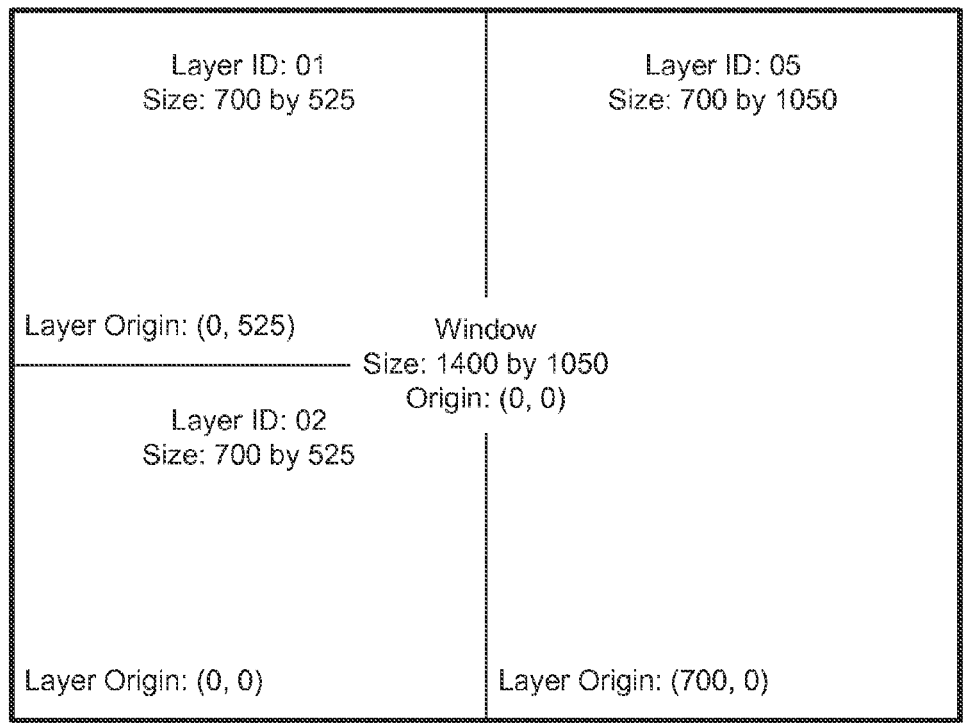
FIG. 2B illustrates a first exemplary display surface format for displaying a local image.

Referring to FIG. 2B, the exemplary display surface format shown is comprised of a single window (depicted with thick borders). In this example, it is assumed that the single window originates from surface pixel location (0, 0) and has the size of 1400 by 1050 pixels. The window is comprised of layers 01, 02, and 05 (depicted with thin borders). Layer 01 originates at window pixel location (0, 525) and has the size of 700 by 525 pixels, layer 02 originates from window pixel location (0, 0) and has the size of 700 by 525 pixels, and layer 05 originates from window pixel location (700, 0) and has the size of 700 by 1050 pixels; herein, window pixel locations are made in reference to the origin of the window. As shown in FIG. 1, layers 01, 02, and 05 are owned by UAs 0001, 0002, and 0004, respectively; UA 0001 is owned by the CDS 130; and UAs 0002 and 0004 are owned by remote aircraft system 120-1. For the purpose of discussion, the sizes of layers 01, 02, and 05 remain the same for the display surface formats of FIGS. 2C and 2D, and layers 03 and 04 and UA 0003 have been intentionally omitted (layer 06 is discussed below).

Figure 2C:
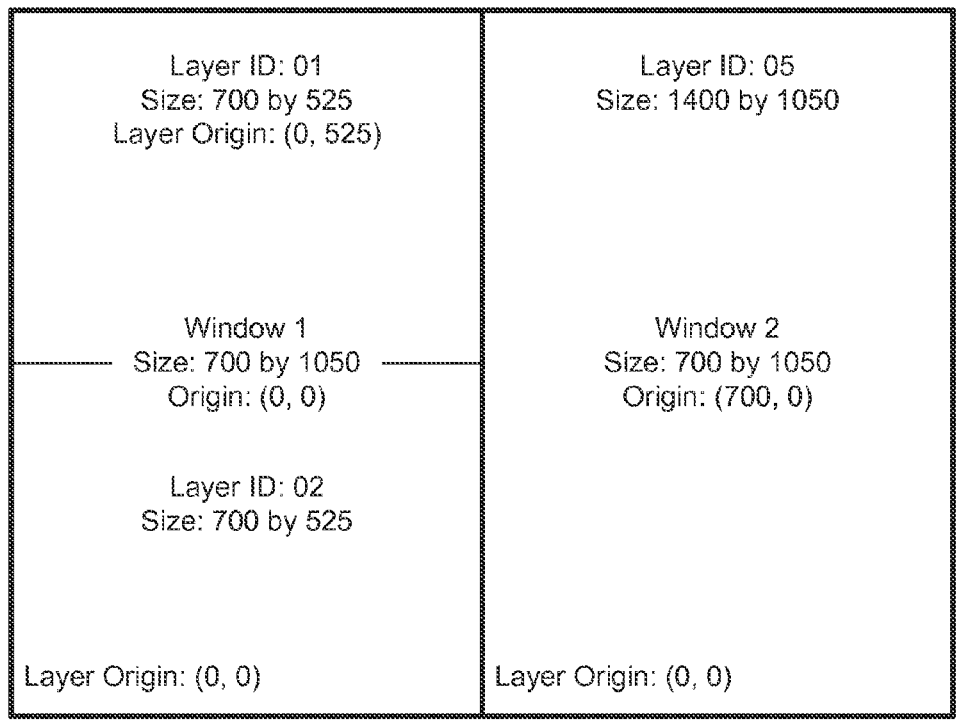
FIG. 2C illustrates a second exemplary display surface format for displaying a local image.

Referring to FIG. 2C, the exemplary display surface format shown is comprised of two windows. In this example, it is assumed that window 1 originates from surface pixel location (0, 0) and has the size of 700 by 1050 pixels, and window 2 originates from surface pixel location (700, 0) and has the size of 700 by 1050 pixels. Window 1 is comprised of layers 01 and 02, where layer 01 originates at pixel location (0, 525) of window 1, and layer 02 originates from pixel location (0, 0) of window 1. Window 2 is comprised of layer 05, where layer 05 originates at pixel location (0, 0) of window 2.

Figure 2D:
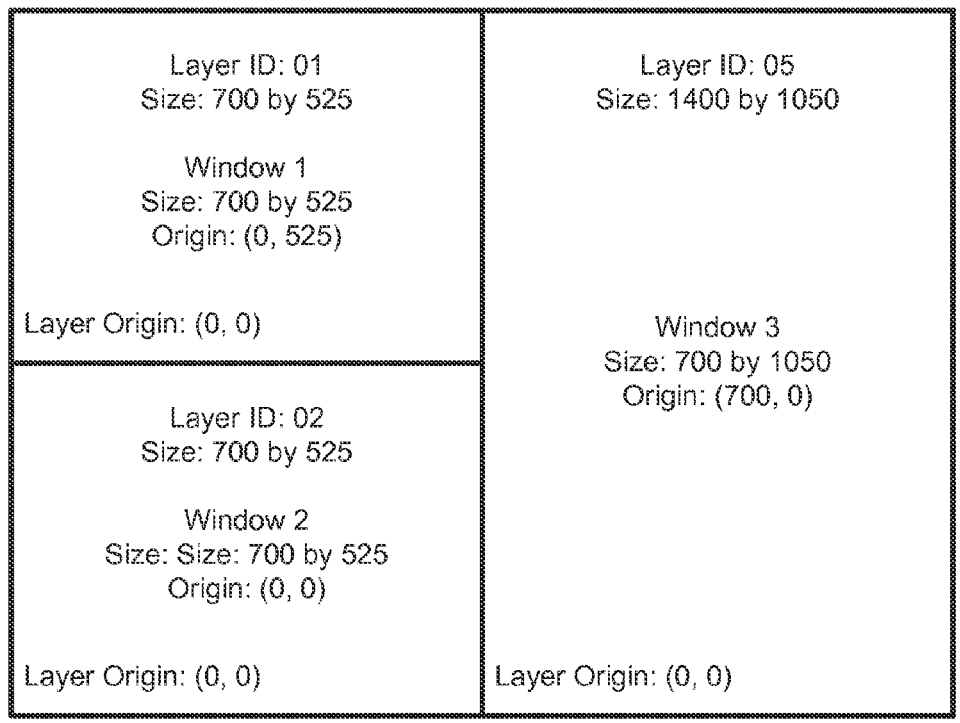
FIG. 2D illustrates a third exemplary display surface format for displaying a local image.

Referring to FIG. 2D, the exemplary display surface format shown is comprised of three windows. In this example, it is assumed that window 1 originates from surface pixel location (0, 525) and has the size of 700 by 525 pixels, window 2 originates from surface pixel location (0, 0) and has the size of 700 by 525 pixels, and window 3 originates from surface pixel location (700, 0) and has the size of 700 by 1050 pixels. Window 1 is comprised of layer 01, window 2 is comprised of layer 02, and window 3 is comprised of layer 05, where each layer originates at pixel location (0, 0) of its respective window.

To arrive at the local image shown in FIG. 2A, the PM 170 could have established a pixel data set representative of the image by employing ARINC 661 protocols. For instance, the layer activation property for layers 01, 02, and 05 has been set to the "on" position. After the PM 170 has sent notices of the activation to UA 0001 of the WMUA 160 and UAs 0002 and 0004 of remote aircraft system 120-1, the PM 170 has received requests from each of them to set the visibility property of these layers to the "on" position.

Figure 3A:
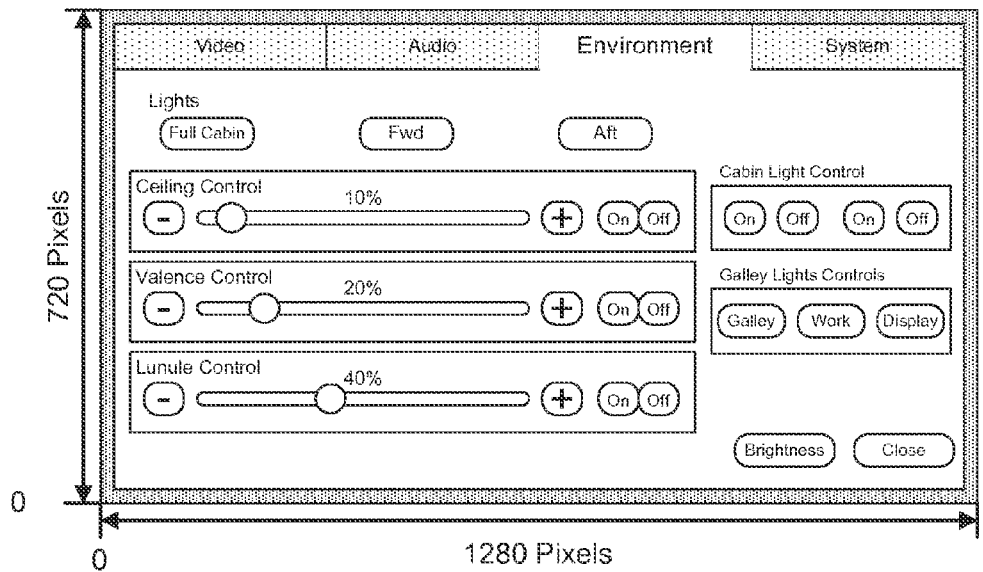
FIG. 3A depicts a remote display unit of a remote aircraft system and an exemplary remote image presented thereon.
Figure 3B:
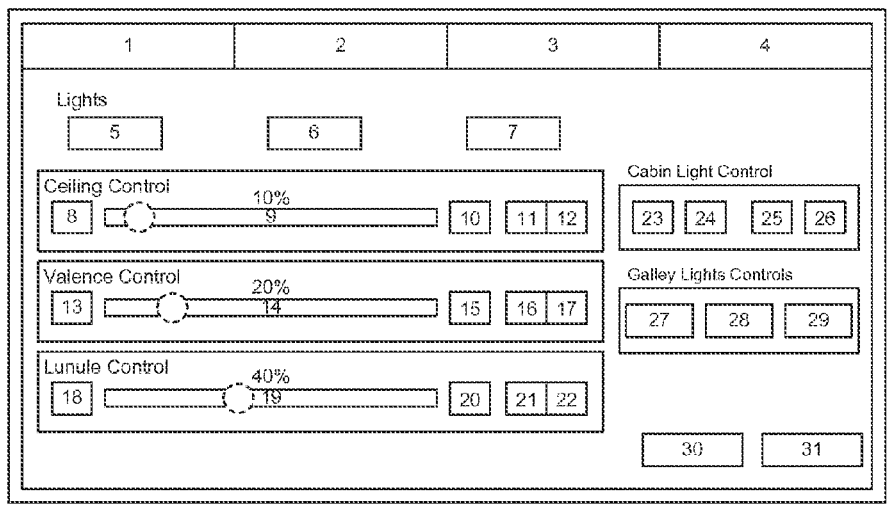
FIG. 3B illustrates an exemplary display surface format for displaying the exemplary remote image of FIG. 3A.

FIGS. 3A and 3B illustrate the remote image depicted on the surface of the remote display unit 122 and one exemplary display surface format that may be used to depict such remote image. For the purpose of illustration and not limitation, FIG. 3A illustrates the remote display unit 122 as a touch screen device having a surface area of 1280 by 720 pixels that depicts a plurality of interactive widgets comprised of index tabs, pushbutton switches, and sliders. As shown in this illustration, the interactive widgets may facilitate the interaction between cabin personnel and a cabin control system used for providing comfort to passengers riding in the cabin during a flight. For the purpose of illustration, the cabin control system will be discussed, and although the following discussion of FIGS. 4 through 7 will be drawn to the image of FIG. 3A, the embodiments disclosed herein are not limited to merely a cabin control system.

Referring to FIG. 3B, the exemplary display surface format shown is comprised of a single window originating from surface pixel location (0, 0) occupying the entire display surface area of 1280 by 720 pixels. The window is comprised of a single layer originating at window pixel location (0, 0) and has the size of 1280 by 720 pixels. The layer is comprised of 31 interactive widgets corresponding to the index tabs (positions 1-4), push button switches (positions 5-8, 10-13, 15-18, and 20-31), and sliders (positions 9, 14, and 19). The location of the origin of each interactive widget is shown in the map table of FIG. 3B as X(ref) and Y(ref), where X(ref) and Y(ref) indicate the number of pixels measured from the origin of the layer to the origin of the widget; similarly, the size of each widget is shown in the map table as X(size) and Y(size), where X(size) and Y(size) are the number of pixels measured from the origin of the widget. As embodied herein, remote aircraft system 120-2 owns the window, layer, and widgets.

The advantages and benefits of the embodiments discussed herein may be illustrated by showing methods in which VNC techniques may be employed by two aircraft systems, where a non-ARINC 661 aircraft system (e.g., remote aircraft system 120-2) and/or a non-ARINC 661 non-aircraft system (e.g., remote non-aircraft system 124) comprised of relatively simple hardware and/or software may be incorporated by an ARINC 661 aircraft system (e.g., the CDS 130) comprised of complex hardware and/or software. Hardware and software design standards have been published by the Radio Technical Commission for Aeronautics ("RTCA"). The RTCA has published DO-254 entitled "Design Assurance Guidance for Airborne Electronic Hardware" and DO-178B entitled "Software Considerations in Airborne Systems and Equipment Certification." Each publication distinguishes between simple and complex electronic hardware, recognizes five classes of failure conditions, and provides guidance for each hardware and/or software DAL associated with a given failure condition.

Level A is considered the highest DAL and corresponds to a "catastrophic" failure condition of which failure of the hardware and/or software may cause a crash. Level B corresponds to a "hazardous" failure condition of which failure may cause a large negative impact on safety or performance, reduces the ability of the crew to operate the aircraft due to physical distress or a higher workload, or causes serious or fatal injuries among the passengers. Level C corresponds to a "major" failure condition of which failure may be significant but have a lesser impact than a hazardous failure or significantly increases crew workload. Level D corresponds to a "minor" failure condition of which failure may be noticeable but have a lesser impact than a major failure. Level E corresponds to a "no effect" failure condition of which failure has no impact on safety, aircraft operation, or crew workload.

FIGS. 4 through 10H illustrate methods in which one protocol (e.g., the VNC protocol) may be adopted and employed simultaneously with another protocol (e.g. the ARINC 661 protocol) to incorporate information generated by a system certified to a low DAL (or no DAL) with information generated by a system certified to a high DAL.

Figure 4A:
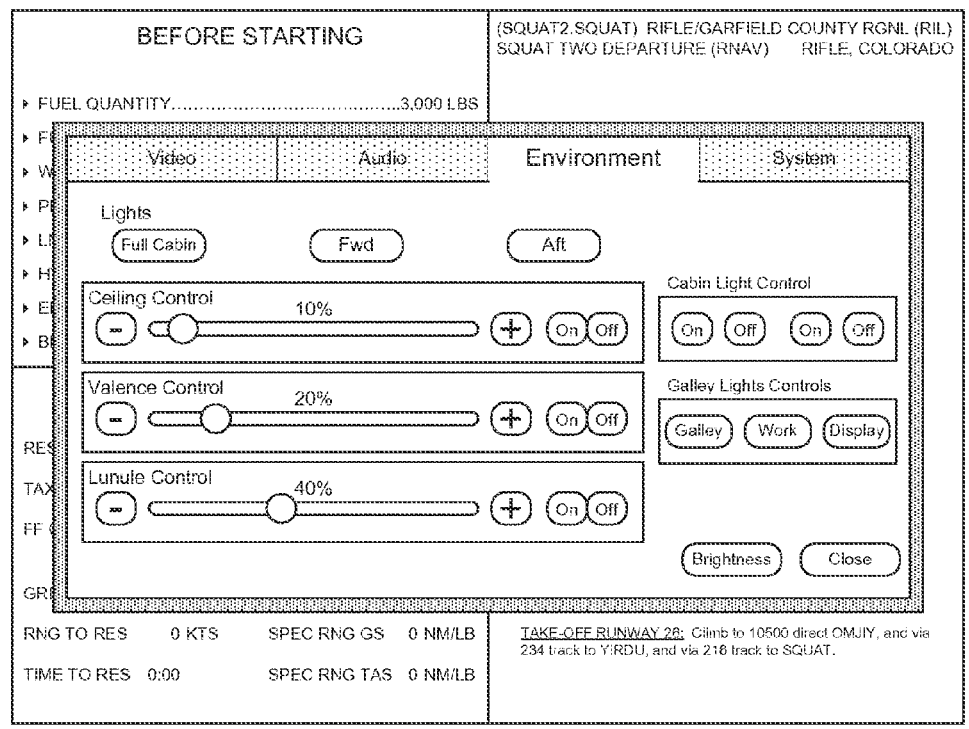
FIG. 4A depicts the exemplary remote image of FIG. 3A simultaneously with the exemplary local image of FIG. 2A when applied to the exemplary display surface format of FIG. 2B.

FIGS. 4A through 4D illustrate the local display unit 180 and the exemplary display surface format of FIG. 2B that may be used for the simultaneous depiction of images facilitated by the use of the ARINC 661 interface protocol between the CDS 130 and the remote aircraft system 120-1 simultaneously with the use of the VNC interface protocol between the CDS 130 and remote aircraft system 120-2. Referring to FIG. 4A, the remote image of FIG. 3A is shown simultaneously with the local image of FIG. 2A when applied to the display surface format of FIG. 2B; moreover, the remote image may or may not be depicted simultaneously on the remote display unit 122. In the examples presented in FIGS. 4 and 5, personnel in the cockpit have access to and view the same image as personnel in the cabin.

To arrive at the local image shown in FIG. 4A, a pilot may have accessed a menu using the pilot input device 110, where the ability to display a menu upon a pilot's request is known to those skilled in the art. From the menu, the pilot could have made a request to enable him or her to make change(s) to the cabin settings via the cabin control system without leaving the cockpit. When the request is made, data representative of the pilot input could be received by the PM 170, where the input data may correspond to a request to display the remote image. In response, the PM 170 could activate layer 06 as well as generate and send data representative of a request to display the remote image to the WMUA 160. As embodied herein, the data could be sent using ARINC 661 protocol, and the request could be comprised of a notice to the WMUA 160 that layer 06 has been activated. In response, the WMUA 160 could forward data representative of the request to the VNC client 0001 which, in turn, could generate and send data representative of a client-to-server message in VNC protocol to the VNC server 0001 requesting RFB data.

In response, the VNC server 0001 could generate and send data representative of a server-to-client message in VNC protocol to the VNC client 0001 providing RFB data. In response, the VNC client 0001 could forward the RFB data to the WMUA 160. In response, the WMUA 160 could turn "on" at least a visibility parameter of the VNC image widget as well as generate and send VNC image widget data corresponding to the RFB data to the PM 170. As embodied herein, the VNC image widget data could be sent using ARINC 661 protocol and include in it a request to turn "on" the visibility property of layer 06. In addition, the WMUA 160 could apply a scaling factor if a scaling factor of one is not applied and/or truncate the RFB data if the WMUA 160 is configured as such. In response, the PM 170 could incorporate the VNC image widget data into the existing pixel data set being used, such that a VNC image widget indicative of the remote image shown in FIG. 4A is represented in the incorporated pixel data set.

Figure 4B:
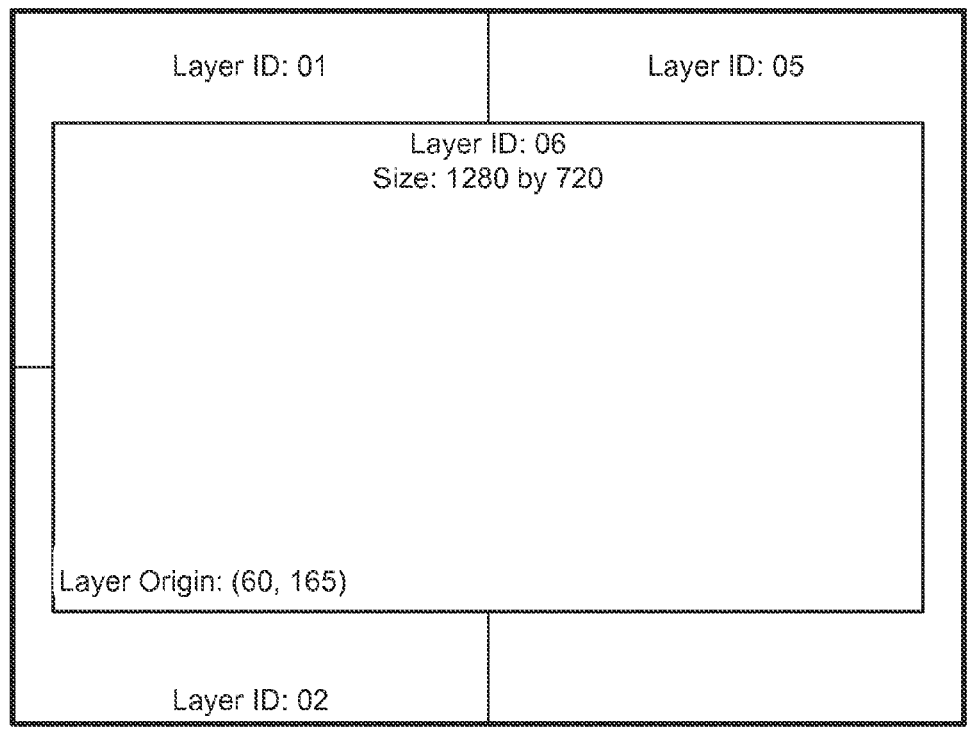
FIG. 4B depicts the exemplary display surface format of FIG. 2B with assigned layers.

Referring to FIG. 4B, the exemplary display surface format of FIG. 2B overlays layer 06 with layers 01, 02, and 05. Layer 06 originates at window pixel location (60, 165) which means it is centered on the window; the size of layer 06 is 1280 by 720 pixels, which means a scaling factor of one has been applied. Since the window for this display surface format has the same size as the surface of the local display unit 180 and the layer is centered on the window, layer 06 is also centered on the surface of the local display unit 180.

Figures 4C, 4D:
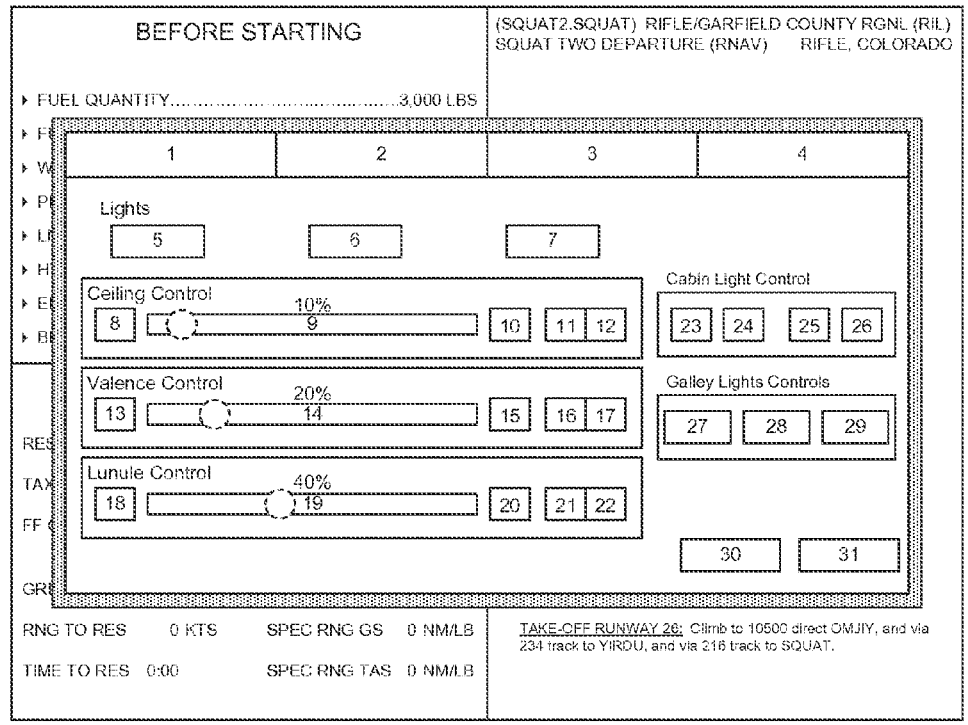
FIG. 4C depicts a map of the interactive widgets of the exemplary display surface format of FIG. 3B against the local image of FIG. 2A.
FIG. 4D depicts a map table corresponding to the map of the interactive widgets of FIG. 4C.

Referring to FIG. 4C, the map of the 31 interactive widgets shown in FIG. 3B is shown in place of its respective image shown of FIG. 4A. Because the image occupies the area of layer 06 and because layer 06 originates at window pixel location (60, 165), the origin of each of the widgets is different than listed in the map table of FIG. 3B. Referring to the map table of FIG. 4D, the locations of X(ref) and Y(ref) for each widget are increased by 60 and 165 pixels, respectively; however, the size of each widget indicated by its X(size) and Y(size) remains the same because the scaling factor of one has been applied.

It should be noted that the each of the 31 widgets have lost their interactive character as a result of the VNC protocol. The VNC server 0001 may send data representative of a server-to-client message to the VNC client via the PM 170. The server-to-client message may be comprised of VNC RFB information. The data sent by the VNC server may inform the VNC client about the number of rectangles included in the data as well as the location and size of each rectangle data. Then, the location of each rectangle could be translated into location information corresponding to layer 06 and the size of each rectangle could be scaled into size information corresponding to layer 06. Then, image data representative of the translated location information and scaled size information could be generated and sent to the display unit, where the image represented in the image data could be presented in the area of layer 06.

Figure 5A:
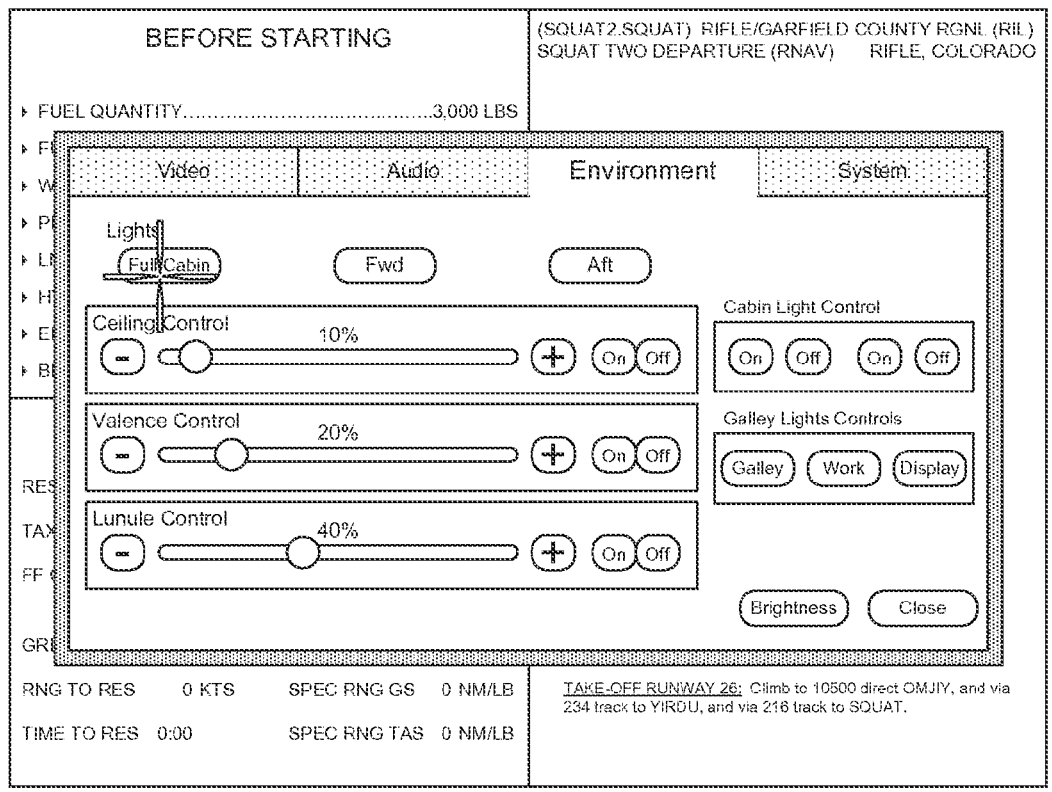
FIG. 5A depicts a selection made on a first local image shown on a local display unit.

In the examples discussed in FIGS. 5 through 7, it will be assumed that personnel in the cockpit want to turn on the lights to the full cabin and move the lunule control to 80%. As shown in FIG. 5A, a cursor has been added to image of FIG. 4A, where the cursor is located over the "Full Cabin" push button of the VNC image widget. Moreover, the VNC image widget has been manually selected by the pilot pressing and releasing the cursor's button.

When the cursor's button is pressed, the PM 170 may be programmed to capture the surface coordinates of the cursor's location (206, 720) and convert them into layer coordinates (146, 555), where the X(layer)=206–60 and Y(layer)=720–165. Because an interaction with a VNC image widget has occurred, the PM 170 may notify the WMUA 160 of the event and provide the current state of the cursor's button (e.g., the cursor's button has been pressed) and the layer coordinates of the cursor's event in the notification. In response, the WMUA 160 could forward data representative of the notification to the VNC client 0001 which, in turn, could generate and send two client-to-server messages in VNC protocol to the VNC server 0001 of the remote aircraft system 120-2.

Figure 5B:
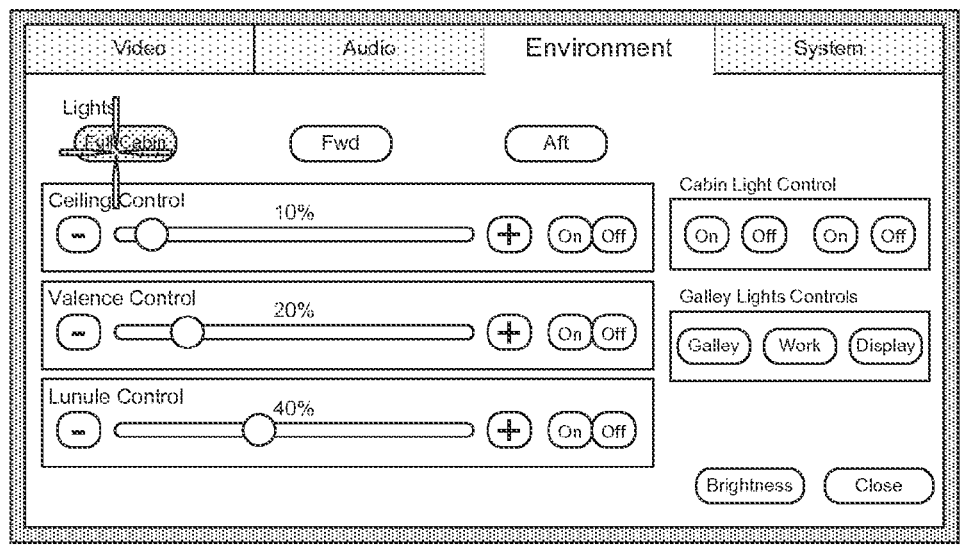
FIG. 5B depicts a change to the remote image corresponding to the selection of FIG. 5A.

In the first message, the VNC client 0001 may generate and send data representative of a client-to-server message to the VNC server 0001 notifying it of the current state of the cursor's button (i.e., pressed) and the event location of the cursor. As this message is received by the VNC server 0001, the remote aircraft system 120-2 may respond as if personnel had pressed the surface at given location (146, 555) of the remote display unit 122; that is, the remote aircraft system 120-2 may respond as if personnel had manually selected the "Full Cabin" interactive widget on the remote display unit 122. This response is indicated in FIG. 5B by the change of appearance of "Full Cabin" interactive widget (as well as the lights in the full cabin being turned on). If the remote image's cursor is present, it could have been located on top of the interactive widget.

In the second message, the VNC client 0001 may generate and send a client-to-server request comprised of data representative of a request for updated RFB information. In one embodiment, information about the entire RFB may be requested. In another embodiment, information about a limited area of the RFB may be requested when a map of the interactive widgets of the remote display has been made available to the PM 170 as a cross-reference. As shown in the map table of FIG. 3B, layer coordinates (146, 555) fall within the area of position 5 which corresponds to a "Full Cabin" push-button switch. After referring to the table, the request for a limited area of the RFB may correspond to X(ref)=90, Y(ref)=555, X(size)=140, and Y(size)=50. It should be noted that, until updated RFB information has been sent to the CDS 130, there will be no change in the appearance of the VNC image widget depicted on the local display unit 180 as shown in FIG. 5A.

In response to receiving the second message, the VNC server 0001 may generate and send data representative of a server-to-client message in VNC protocol to the VNC client 0001 providing it with the updated RFB data of either the entire RFB or the limited-area RFB. In response, the VNC client 0001 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 5C is represented in the newly-incorporated pixel data set.

In an embodiment in which the cursor's button is pressed but not released (such as in a manual input of "clicking and dragging"), the PM 170 may be programmed to capture the surface coordinates of the cursor's location and convert them into layer coordinates repeatedly while the button is pressed. For the purpose of illustration, it will be assumed that the position of the Lunule Control slider shown in FIG. 5A will be changed by personnel in the cockpit by "clicking and dragging" the round button of the slider until the slider is located at the 80% position. Because an interaction with a widget is occurring continuously, the PM 170 may repeatedly notify the WMUA 160 of the continuous VNC image widget event by providing the current (unchanged) state of the cursor's button and the (changing) layer coordinates of the cursor's location in each notification. In response to the repeated notifications, the WMUA 160 could forward data representative of the notification repeatedly to the VNC client 0001 which, in turn, could generate and send two client-to-server messages in VNC protocol repeatedly to the VNC server 0001 of the remote aircraft system 120-2 2.

In the repeated first messages, the VNC client 0001 may generate and send repeatedly data representative of client-to-server messages to the VNC server 0001 notifying it of the current (unchanging) state of the cursor's button and the current (changing) location of the cursor. As each of the repeated first messages are received by the VNC server, the remote aircraft system 120-2 may respond as if personnel had placed his or her finger on top of the round button of the interactive Lunule Control slider of the remote display unit 122 (assuming a touch screen in this example) and moved his or her finger to the right, "dragging" the slider to the right until his or her finger is lifted from the screen presumably as the position of the slider reaches the 80% position (and the lunule lights reach 80%).

In the repeated second messages, the VNC client 0001 may repeatedly generate and send data representative of client-to-server messages to the VNC server 0001 requesting it for updated RFB information of either the entire RFB or a limited-area RFB in the same fashion as discussed above. In response to receiving each repeated second message, the VNC server 0001 may generate and send data representative of a server-to-client message to the VNC client 0001 providing it with the updated RFB data of either the entire RFB or the limited-area RFB. In response, the VNC client 0001 could forward the updated RFB data to the WMUA 160 repeatedly. In response, the WMUA 160 could generate and send updated VNC image widget data corresponding to the RFB data to the PM 170 repeatedly. In response, the PM 170 could incorporate the updated VNC image widget data into the existing pixel data set repeatedly. As a result, a VNC image widget will be displayed on the surface of the local display unit 180 in which the Lunule Control slider will appear to move to the right until the cursor's button is released when the 80% position has been reached.

It should be noted that, although the remote aircraft system 120-2 responded to pressing of the cursor's button, a manufacturer and/or end-user could have configured the remote aircraft system 120-2 to respond when the cursor's button has been released and not when it's been pressed. In such configuration, the current state of the cursor's button in the first message generated by the WMUA 160 could have corresponded to the releasing of the cursor's button instead of the pressing of the cursor's button. Alternatively, an additional message corresponding to the releasing of the cursor's button could have been generated by the WMUA 160 in sequence after the first message but before the second message.

Figure 6B:
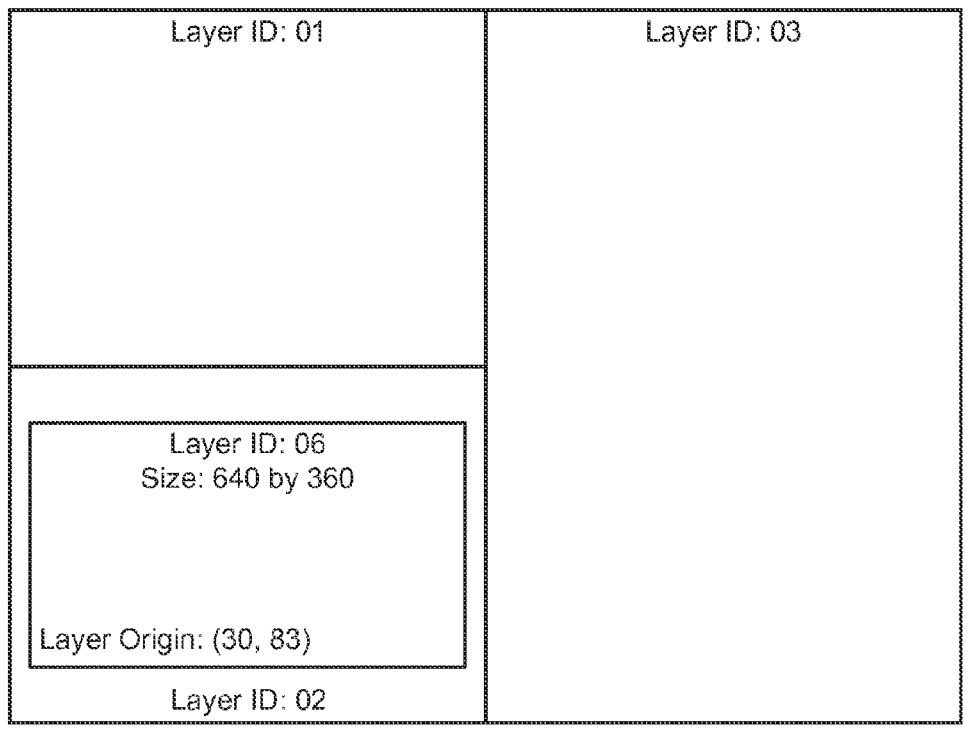
FIG. 6B depicts the exemplary display surface format of FIG. 2D with assigned layers.

FIGS. 6A through 6D illustrate the local display unit 180 and the exemplary display surface format of FIG. 2D that may be used for the simultaneous depiction of images facilitated by the use of the ARINC 661 interface protocol between the CDS 130 and the remote aircraft system 120-1 simultaneously with the use of the VNC interface protocol between the CDS 130 and remote aircraft system 120-2. Referring to FIG. 6A, the remote image of FIG. 3A is shown simultaneously with the local image of FIG. 2A when applied to the display surface format of FIG. 2D; as stated above, the remote image may or may not be depicted simultaneously on the remote display unit 122. In the example presented in FIGS. 6 and 7, personnel in the cockpit have access to and view the same image as personnel in the cabin Referring to FIG. 6B, layer 06 overlays with layer 02 in window 2 in the display surface format of FIG. 2D. Layer 06 originates at window pixel location (30, 83) which means it is approximately centered on window 2; in this example, a scaling factor of 0.5 has been applied as the size of layer 06 of 640 by 360 pixels indicates.

Figure 6C:
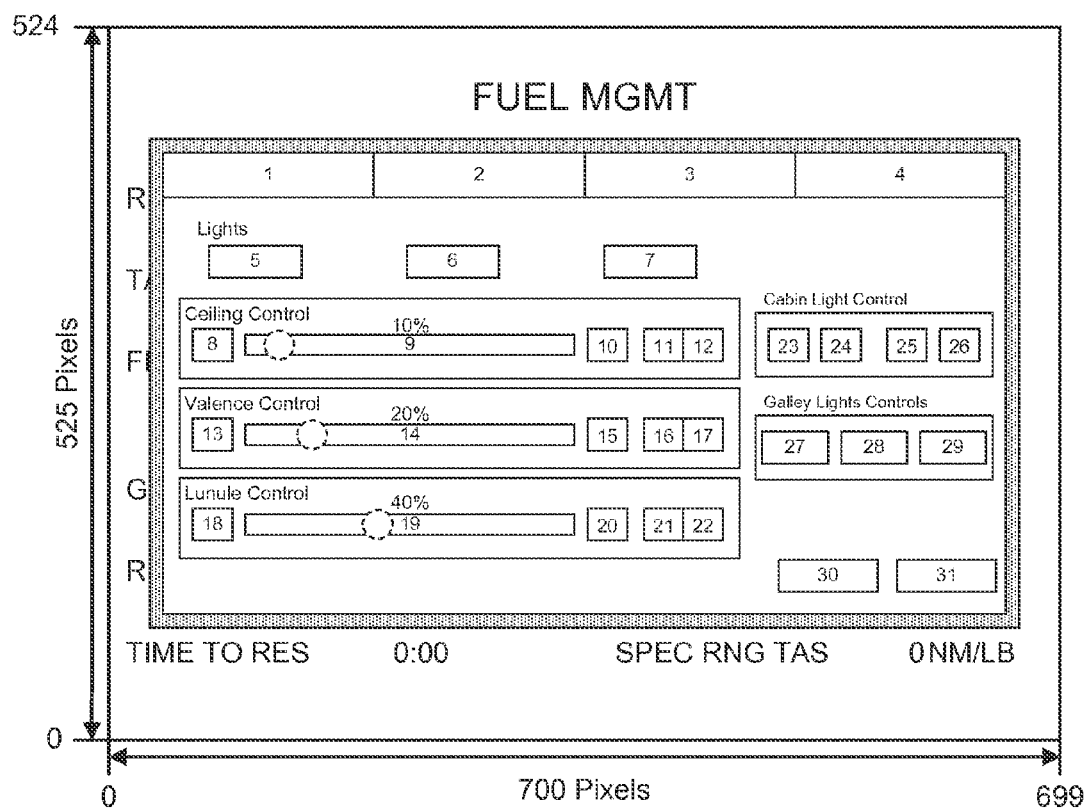
FIG. 6C depicts a map of the interactive widgets of the exemplary display surface format of FIG. 3B against part of the local image of FIG. 2A.

Referring to FIG. 6C, the map of the 31 interactive widgets shown in FIG. 3B is shown in place of its respective image shown of FIG. 4A as depicted over the "FUEL MGMT" panel of the lower left half of the control panel shown of FIG. 6A. Because the image occupies the area of layer 06 and because layer 06 originates at window pixel location (30, 83), the origin of each of the widgets is different than listed in the map table of FIG. 3B. Referring to the map table of FIG. 6D, the X(ref) and Y(ref) locations of FIG. 6C are found by adding 30 and 83 to one-half the X(ref) and Y(ref) locations of FIG. 3B, respectively, where the one-half corresponds to the scaling factor; additionally, the X(size) and Y(size) of each widget has been reduced by one-half because a scaling factor of 0.5 has been applied.

Figures 6D, 7A:
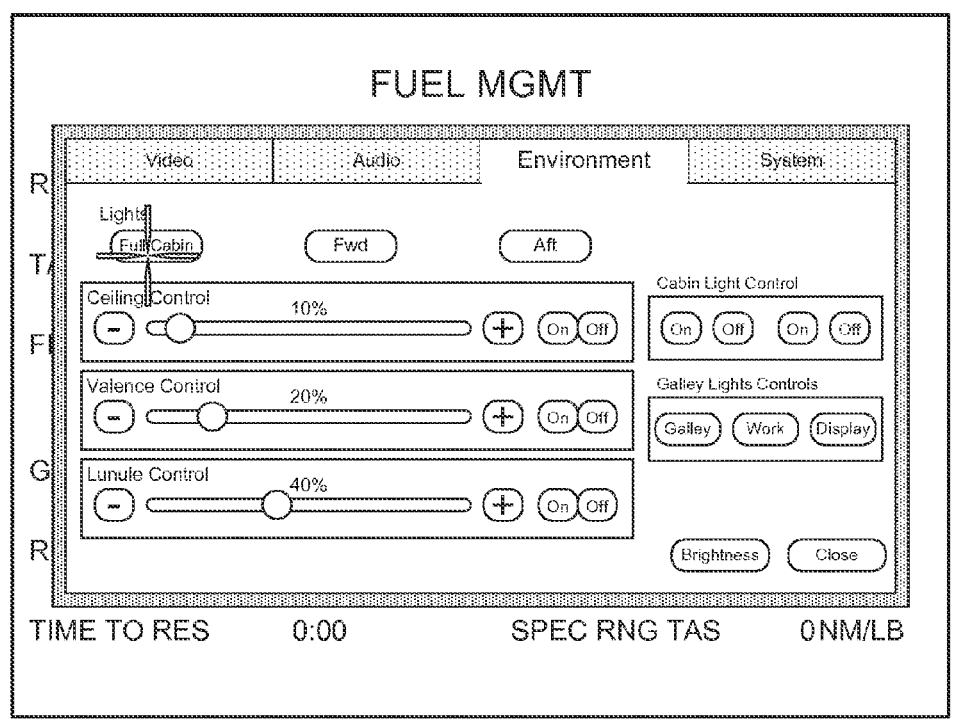
FIG. 6D depicts a map table corresponding to the map of the interactive widgets of FIG. 6C.
FIG. 7A depicts a selection made on a second local image shown on a local display unit.
Figure 7B:
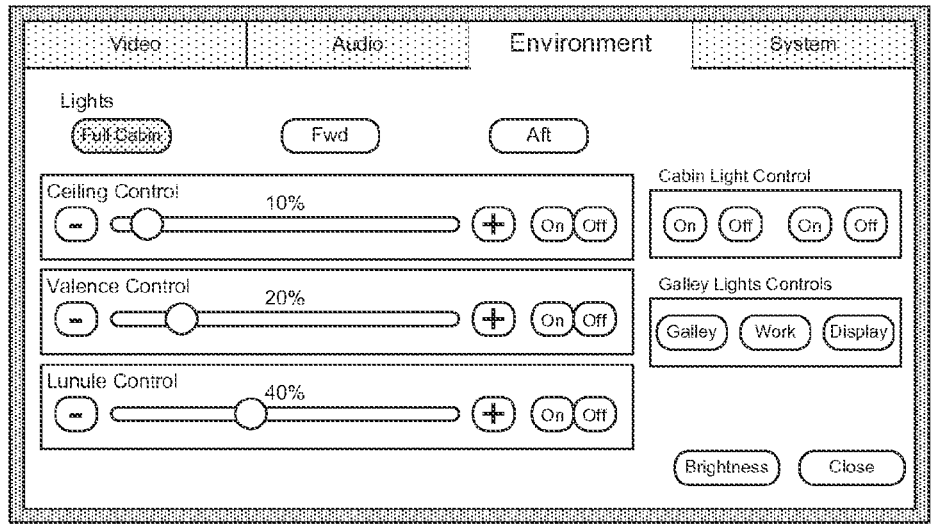
FIG. 7B depicts a change to the remote image corresponding to the selection of FIG. 7A.
Figure 7C:
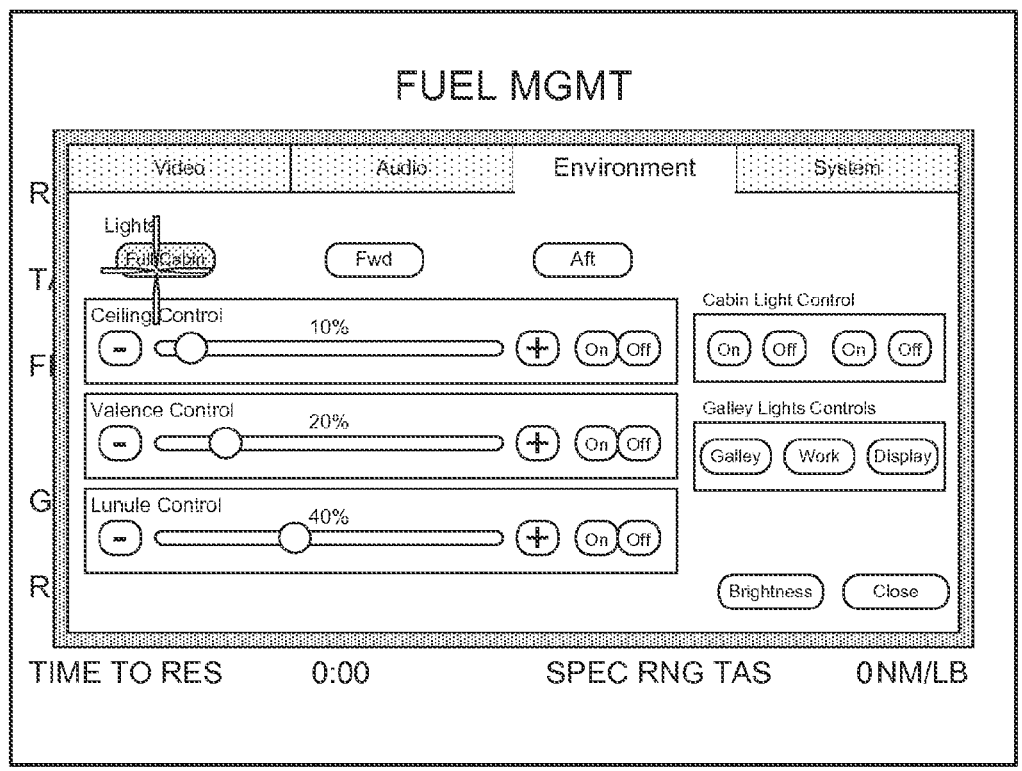
FIG. 7C depicts a change to the local image corresponding to the change of FIG. 7B.

For the example illustrated by FIGS. 7A through 7C, it will be assumed that personnel in the cockpit want to turn on the lights to the full cabin and move the lunule control to 80% as in FIGS. 5A through 5C; however, the exemplary display surface format shown in FIG. 2D that has been employed in FIGS. 6A through 6D will be used.

As shown in FIG. 7A, a cursor has been added to image of FIG. 6A, where the cursor is located over the "Full Cabin" push button of the VNC image widget. Moreover, the VNC image widget has been manually selected by the pilot pressing and releasing the cursor's button. When the cursor's button is pressed, the PM 170 may be programmed to capture the surface coordinates of the cursor's location (103, 361) and convert them into layer coordinates (146, 556), where the X(layer)=(103−30)/0.5 and Y(layer)=(361−83)/0.5 (where 0.5 is the scaling factor). Because an interaction with a VNC image widget has occurred, the PM 170 may notify the WMUA 160 of the event and provide the current state of the cursor's button (e.g., the cursor's button has been pressed) and the layer coordinates of the cursor's event in the notification. In response, the WMUA 160 could forward data representative of the notification to the VNC client 0001 which, in turn, could generate and send two client-to-server messages in VNC protocol to the VNC server 0001 of the remote aircraft system 120-2.

Following the same discussion as presented above for the first message, the VNC client 0001 may generate and send data representative of a client-to-server message to the VNC server 0001 notifying it of the current state of the cursor's button and the event location of the cursor. As this message is received by the VNC server 0001, the remote aircraft system 120-2 may respond as if personnel had pressed the surface at given location (146, 556) of the remote display unit 122; that is, the remote aircraft system 120-2 may respond as if personnel had manually selected the "Full Cabin" interactive widget on the remote display unit 122. This response is indicated in FIG. 7B by the change of appearance of "Full Cabin" interactive widget (as well as the lights in the full cabin being turned on). If the remote image's cursor is present, it could have been located on top of the interactive widget; unlike in FIG. 5B, however, the configuration of the remote display unit 122 of FIG. 7B does not include a cursor.

Following the same discussion as presented above for the second message, the VNC client 0001 may generate and send a client-to-server request comprised of data representative of a request for updated RFB information, either the entire RFB or a limited-area RFB. As shown in the map table of FIG. 3B, layer coordinates (146, 556) fall within the area of position 5 which corresponds to a "Full Cabin" pushbutton switch. After referring to the table, the request for a limited area of the RFB may correspond to X(ref)=90, Y(ref)=546, X(size)=140, and Y(size)=50.

In response to receiving the second message, the VNC server 0001 may generate and send data representative of a server-to-client message in VNC protocol to the VNC client 0001 providing it with the updated RFB data of either the entire RFB or the limited-area RFB. In response, the VNC client 0001 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 7C is represented in the newly-incorporated pixel data set.

Figures 8A, 8B:
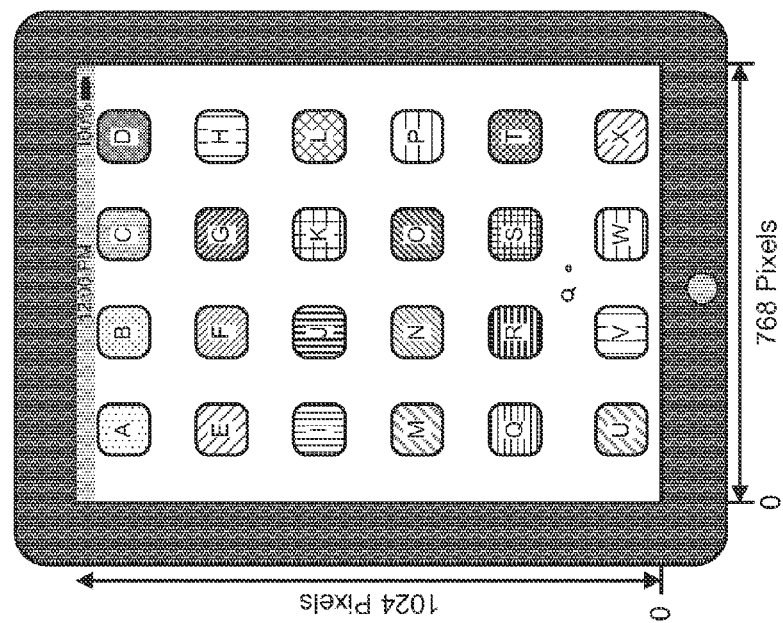
FIG. 8A depicts a remote display unit of a remote non-aircraft system and a first exemplary remote image presented thereon.
FIG. 8B illustrates an exemplary display surface format for displaying the first exemplary remote image of FIG. 8A.
Figure 8C:
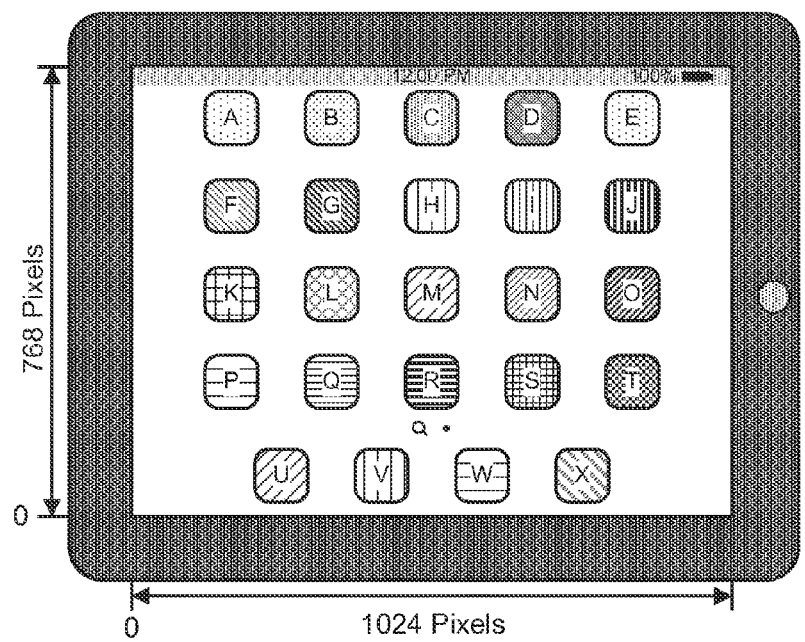
FIG. 8C depicts a remote display unit of a remote non-aircraft system and a second exemplary remote image presented thereon.
Figure 8D:
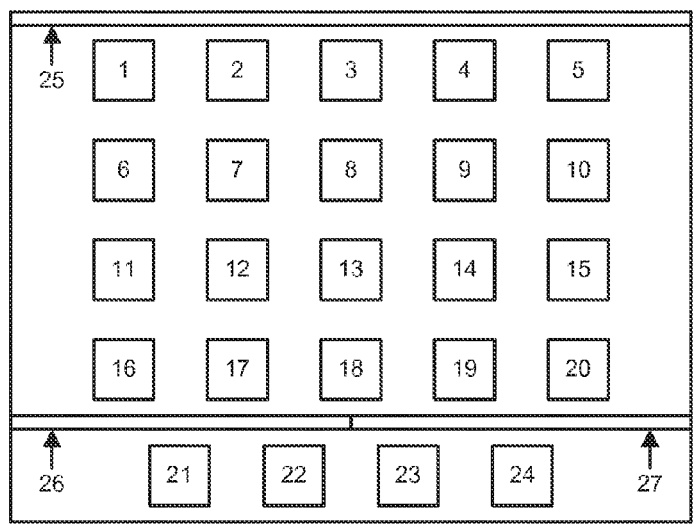
FIG. 8D illustrates an exemplary display surface format for displaying the second exemplary remote image of FIG. 8C.

FIGS. 8A and 8C illustrate two remote images depicted on the surface of the remote display unit 126 in a portrait orientation and a landscape orientation respectively; FIGS. 8B and 8D illustrate two exemplary display surface formats that may be used to depict the remote images of FIGS. 8A and 8C respectively. For the purpose of illustration and not limitation, FIGS. 8A and 8C illustrate a remote display unit 126 comprised of an iPAD® having a surface area of 768 by 1024 pixels in the portrait orientation and 1024 by 768 pixels in the landscape orientation, where the remote display unit 126 depicts a plurality of interactive widgets. As shown in these illustrations, the interactive widgets may facilitate the interaction between a user of the iPAD® and an application available to the user by tapping on one or more interactive widgets. For the purpose of illustration, the iPAD® will be discussed, and although the following discussion will be drawn to the images of FIGS. 8A and 8C, the embodiments disclosed herein are not limited to merely an iPAD®. Instead, the embodiments disclosed herein could be applied to both portable or non-portable devices such as, but not limited to, other tablet devices, electronic flight bags, smartphones, laptop computers, and/or desktop computers irrespective of location (i.e., internal or external to the aircraft) with which the PM 170 is in communication and in which one or more applications are installed and/or accessible to a user.

Referring to FIG. 8B, the exemplary display surface format shown corresponds to the remote image of FIG. 8A and is comprised of a single window originating from surface pixel location (0, 0) occupying the entire display surface area of 768 by 1024 pixels of the portrait orientation. The window is comprised of a single layer originating at window pixel location (0, 0) and has the size of 768 by 1024 pixels. The layer is comprised of 27 interactive widgets corresponding to icons labeled A through X (positions 1-24), a status bar (position 25), and change screen rows (positions 26 and 27). Similar to FIG. 3B, the location of the origin of each interactive widget and its size are shown in the map table of FIG. 8B. As embodied herein, remote aircraft system 124 owns the window, layer, and interactive widgets of FIG. 8B.

Referring to FIG. 8D, the exemplary display surface format shown corresponds to the remote image of FIG. 8C and is comprised of a single window originating from surface pixel location (0, 0) occupying the entire display surface area of 1024 by 768 pixels for the landscape orientation. The window is comprised of a single layer originating at window pixel location (0, 0) and has the size of 1024 by 768 pixels. The layer is comprised of the same 27 interactive widgets of FIG. 8B, and similar to FIGS. 3B and 8B, the location of the origin of each interactive widget and its size are shown in the map table of FIG. 8D. As embodied herein, remote aircraft system 124 owns the window, layer, and interactive widgets of FIG. 8D.

Figure 9A:
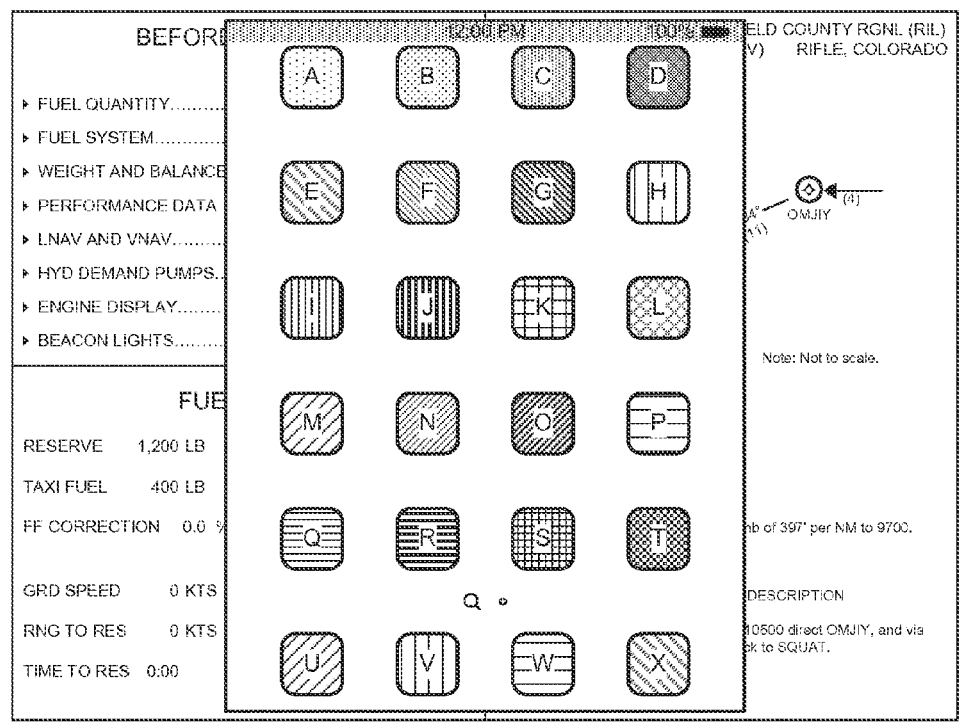
FIG. 9A depicts the first exemplary remote image of FIG. 8A simultaneously with the exemplary local image of FIG. 2A when applied to the exemplary display surface format of FIG. 2B.
Figure 9B:
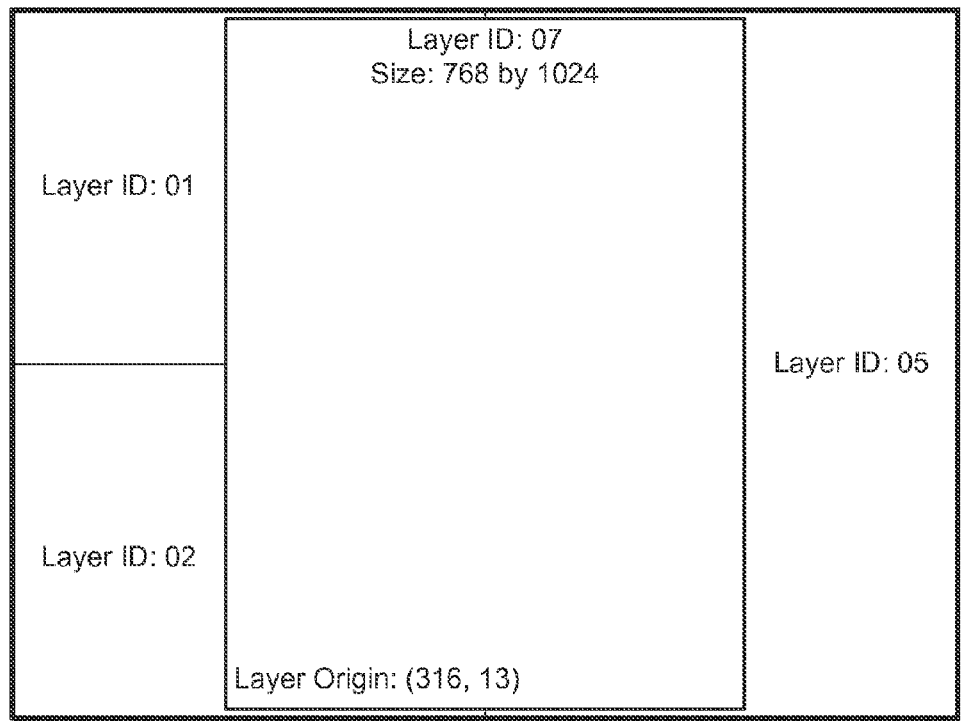
FIG. 9B depicts the exemplary display surface format of FIG. 2B with assigned layers.
Figures 9C, 9D:
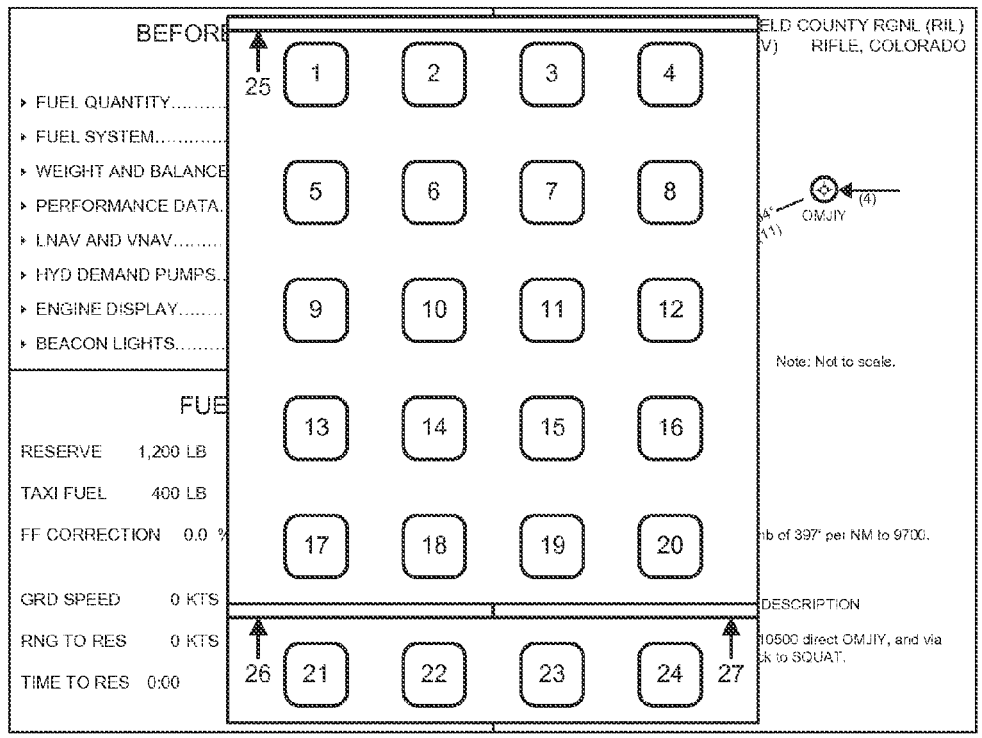
FIG. 9C depicts a map of the interactive widgets of the exemplary display surface format of FIG. 9B against the local image of FIG. 2A.
FIG. 9D depicts a map table corresponding to the map of the interactive widgets of FIG. 9C.
Figure 9E:
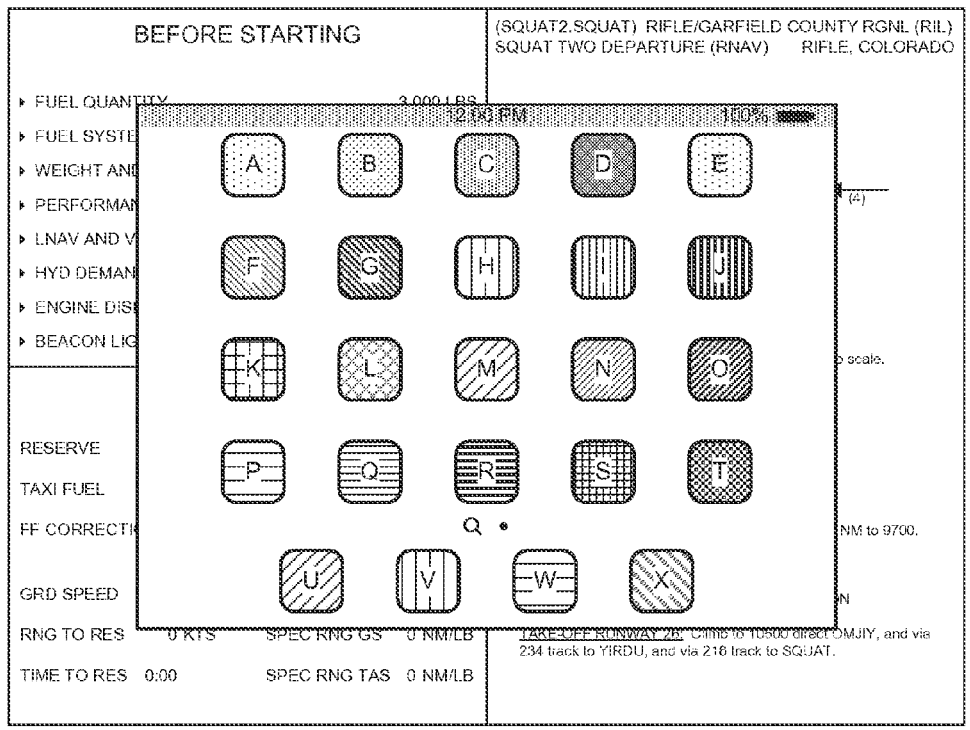
FIG. 9E depicts the second exemplary remote image of FIG. 8C simultaneously with the exemplary local image of FIG. 2A when applied to the exemplary display surface format of FIG. 2B.

FIGS. 9A through 9H illustrate the local display unit 180 and the exemplary display surface format of FIG. 2B that may be used for the simultaneous depiction of images facilitated by the use of the ARINC 661 interface protocol between the CDS 130 and the remote aircraft system 120-1 simultaneously with the use of the VNC interface protocol between the CDS 130 and the remote non-aircraft system 124. Referring to FIGS. 9A and 9E, the remote images of FIGS. 8A and 8C, respectively, are shown simultaneously with the local image of FIG. 2A when applied to the display surface format of FIG. 2B; moreover, the remote images may or may not be depicted simultaneously on the remote non-aircraft system 124. In the examples presented in FIGS. 9A through 10H, personnel in the cockpit have access to and view the same image as personnel viewing the remote image.

To arrive at the local image shown in FIGS. 9A and 9E, a pilot may have accessed a menu using the pilot input device 110, where the ability to display a menu upon a pilot's request is known to those skilled in the art. From the menu, the pilot could have made a request to enable him or her to interact with the remote non-aircraft system 124 without leaving the cockpit. When the request is made, data representative of the pilot input could be received by the PM 170, where the input data may correspond to a request to display the remote image. In response, the PM 170 could activate layers 06 and/or 07 as well as generate and send data representative of a request to display the remote image to the WMUA 160. As embodied herein, the data could be sent using ARINC 661 protocol and the request could be comprised of a notice to the WMUA 160 that layers 06 and/or 07 has been activated. In response, the WMUA 160 could forward data representative of the request to the VNC client 0002 which, in turn, could generate and send data representative of a client-to-server message in VNC protocol to the VNC server 0002 requesting RFB data.

In response, the VNC server 0002 could generate and send data representative of a server-to-client message in VNC protocol to the VNC client 0002 providing RFB data which includes data representative of the portrait or landscape orientation; RFB widths of 768 pixels and 1024 pixels indicate portrait and landscape orientations, respectively. In response, the VNC client 0002 could forward the RFB data to the WMUA 160. In response, the WMUA 160 could turn "on" at least a visibility parameter of the VNC image widget as well as generate and send VNC image widget data corresponding to the RFB data to the PM 170. As embodied herein, the VNC image widget data could be sent using ARINC 661 protocol and include in it a request to turn "on" the visibility property of layer 06 if the RFB data represents the portrait orientation (and a request to deactivate layer 07 if previously activated) or the visibility property of layer 07 if the RFB data represents the landscape orientation (and a request to deactivate layer 06 if previously activated). In addition, the WMUA 160 could apply a scaling factor if a scaling factor of one is not applied and/or truncate the RFB data if the WMUA 160 is configured as such. In response, the PM 170 could incorporate the VNC image widget data into the existing pixel data set being used, such that a VNC image widget indicative of the remote images shown in FIG. 9A or 9E is represented in the incorporated pixel data set.

Figure 9F:
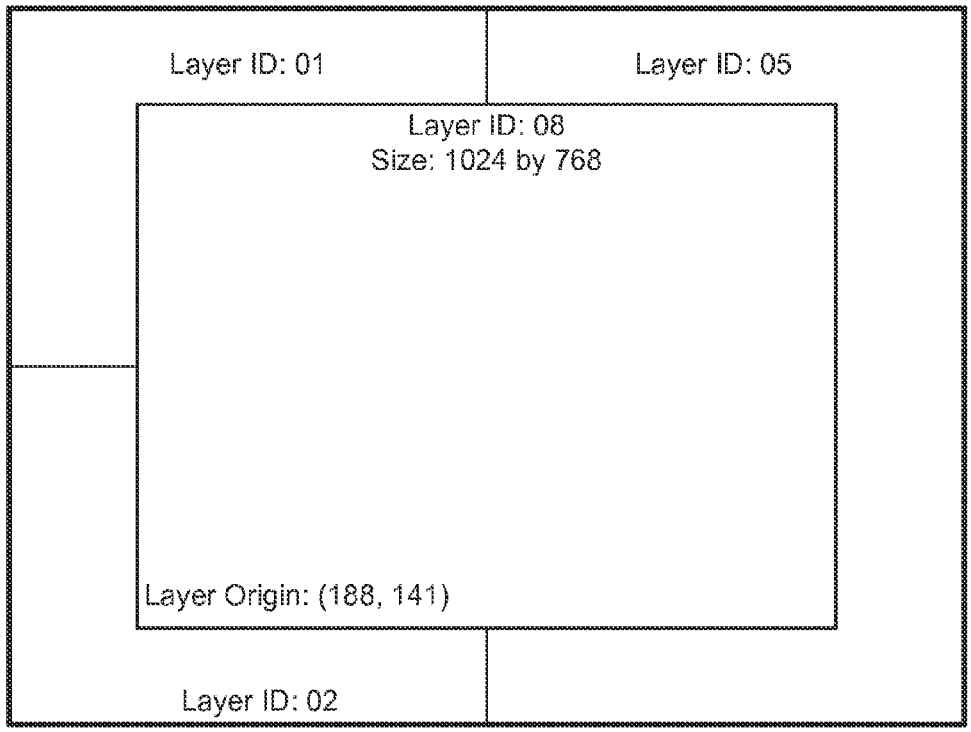
FIG. 9F depicts the exemplary display surface format of FIG. 2B with assigned layers.
Figures 9G, 9H:
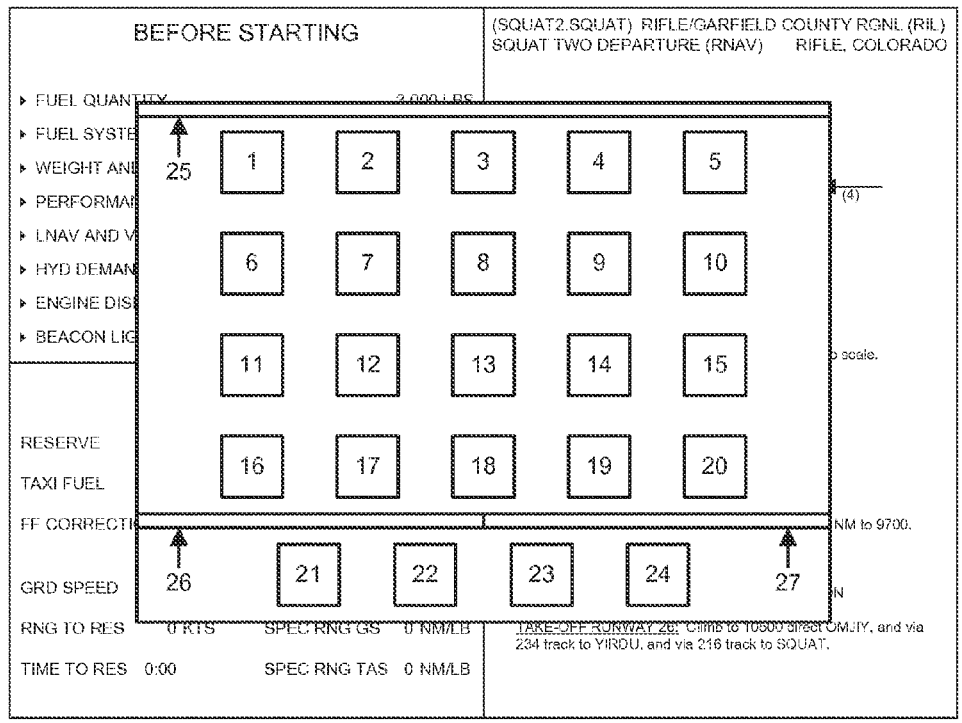
FIG. 9G depicts a map of the interactive widgets of the exemplary display surface format of FIG. 9F against the local image of FIG. 2A.
FIG. 9H depicts a map table corresponding to the map of the interactive widgets of FIG. 9G.

Referring to FIGS. 9B and 9F, the exemplary display surface format of FIG. 2B overlays layer 07 and 08, respectively, with layers 01, 02, and 05. Layer 07 originates at window pixel location (316, 13) and layer 08 originates at window pixel location (188, 141) which means both are centered on the window; the size of layers 07 and 08 are 768 by 1024 pixels and 1024 by 768 pixels, respectively, which means a scaling factor of one has been applied to both. Since the window for this display surface format has the same size as the surface of the local display unit 180 and layers 07 and 08 are centered on the window; layers 07 and 08 are also centered on the surface of the local display unit 180.

FIGS. 8A and 8C illustrate two remote images depicted on the surface of the remote display unit 126 in a portrait orientation and a landscape orientation respectively; FIGS. 8B and 8D illustrate two exemplary display surface formats that may be used to depict the remote images of FIGS. 8A and 8C respectively. For the purpose of illustration and not limitation, FIGS. 8A and 8C illustrate a remote display unit 126 comprised of an iPAD® having a surface area of 768 by 1024 pixels in the portrait orientation and 1024 by 768 pixels in the landscape orientation, where the remote display unit 126 depicts a plurality of interactive widgets. As shown in these illustrations, the interactive widgets may facilitate the interaction between a user of the iPAD® and an application available to the user by tapping on one or more interactive widgets. For the purpose of illustration, the iPAD® will be discussed, and although the following discussion will be drawn to the images of FIGS. 8A and 8C, the embodiments disclosed herein are not limited to merely an iPAD®. Instead, the embodiments disclosed herein could be applied to both portable or non-portable devices such as, but not limited to, other tablet devices, electronic flight bags, smartphones, laptop computers, and/or desktop computers irrespective of location (i.e., internal or external to the aircraft) with which the PM 170 is in communication and in which one or more applications are installed and/or accessible to a user.

It should be noted that the each of the 27 widgets have lost their interactive character as a result of the VNC protocol. The VNC server 0002 may send data representative of server-to-client message to the VNC client 0002 via the PM 170. The server-to-client message may be comprised of VNC RFB information which includes portrait orientation information. The data sent by the VNC server 0002 may inform the VNC client about the number of rectangles included in the data, the location and size of each rectangle data. Then, the location of each rectangle could be translated into location information corresponding to layer 07 or layer 08 and the size of each rectangle could be scaled into size information corresponding to layer 07 or layer 08. Then, image data representative of the translated location information and scaled size information could be generated and sent to the display unit, where the image represented in the image data could be presented in the area of layer 07 or layer 08.

Figures 10C, 10D:
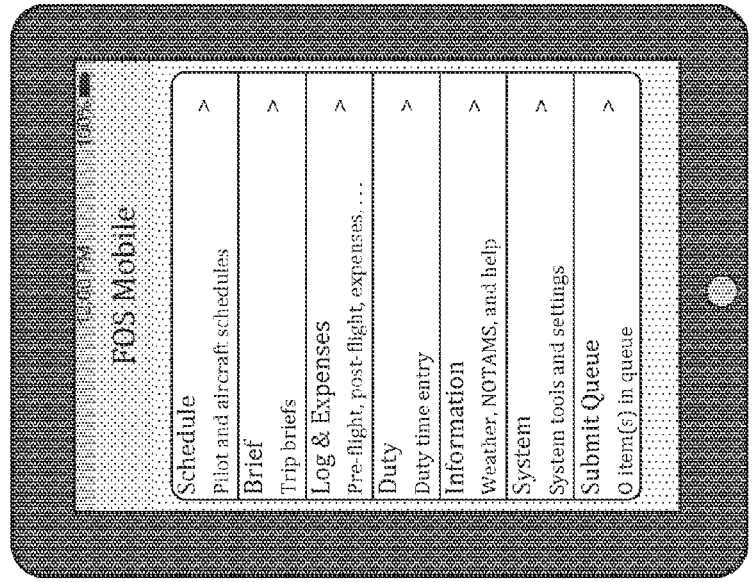
FIG. 10C depicts a second change to the remote image after the first change of FIG. 10B.
FIG. 10D depicts a change to the local image corresponding to the change of FIG. 10C.
Figures 10E, 10F:
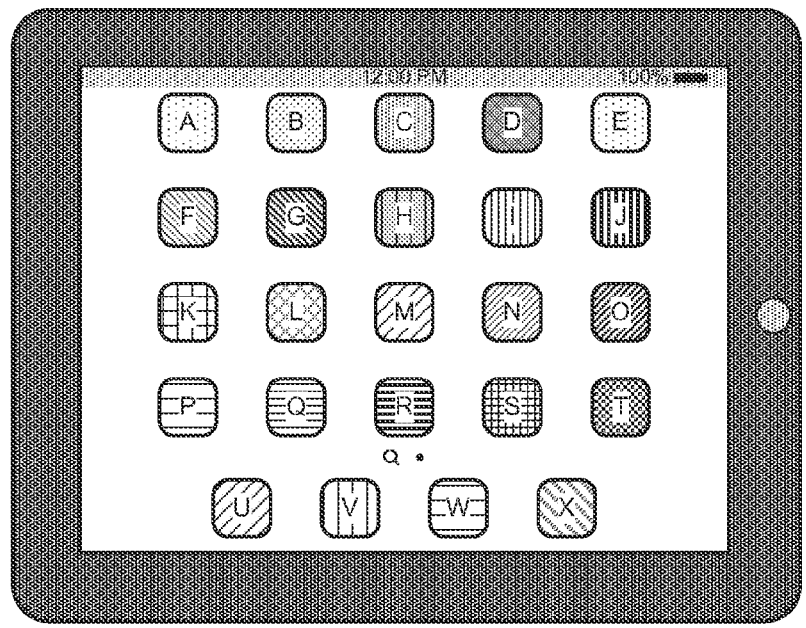
FIG. 10E depicts a selection made on a second local image shown on a local display unit.
FIG. 10F depicts a first change to the remote image corresponding to the selection of FIG. 10E.

In the examples discussed in FIGS. 10A through 10H, it will be assumed that personnel in the cockpit want to access a Flight Operations System ("FOS") application known as FOS MOBILE™, a comprehensive flight operations management and support system supplied by Rockwell Collins, Inc. to operators in the aviation industry such as, but not limited to, corporate, charter, and government aviation as well as regional airlines, aircraft management, and fractional ownership companies; FOS MOBILE™ is accessible by tapping the "H" interactive widget of the remote display unit 126. As shown in FIGS. 10A and 10E, a cursor has been added to each of the images of FIGS. 9A and 9E, respectively, where each cursor is located over the "H" icon of the VNC image widget. Moreover, the VNC image widget has been manually selected by the pilot pressing and releasing the cursor's button.

When the cursor's button is pressed in FIG. 10A, the PM 170 may be programmed to capture the surface coordinates of the cursor's location (940, 755) and convert them into layer coordinates (624, 742), where the X(layer)=940−316 and Y(layer)=755−13. Because an interaction with a VNC image widget has occurred, the PM 170 may notify the WMUA 160 of the event and provide the current state of the cursor's button and the layer coordinates of the cursor's event in the notification. In response, the WMUA 160 could forward data representative of the notification to the VNC client 0002 which, in turn, could generate and send two client-to-server messages in VNC protocol to the VNC server 0002 of the remote non-aircraft system 124.

In the first message, the VNC client 0002 may generate and send data representative of a client-to-server message to the VNC server 0002 notifying it of the current state of the cursor's button (i.e., pressed) and the event location of the cursor. As this message is received by the VNC server 0002, the remote non-aircraft system 124 may respond as if personnel had pressed the surface at given location (624, 742) of the remote display unit 126; that is, the remote non-aircraft system 124 may respond as if personnel had manually selected the "H" interactive widget on the remote display unit 126. This response is indicated in FIG. 10B by a change of appearance of "H" interactive widget followed by the appearance of a main menu of FOS MOBILE™ as shown in FIG. 10C. It should be noted that, if the remote non-aircraft system 124 is other than an iPAD®, a cursor could have been located on top of the interactive widget if one is employed.

In the second message, the VNC client 0002 may generate and send a client-to-server request comprised of data representative of a request for updated RFB information. In one embodiment, information about the entire RFB may be requested. In another embodiment, information about a limited area of the RFB may be requested when a map of the interactive widgets of the remote display has been made available to the PM 170 as a cross-reference. As shown in the map table of FIG. 8B, layer coordinates (624, 742) fall within the area of position 8 which corresponds to the "H" interactive widget. After referring to the table, the request for a limited area of the RFB may correspond to X(ref)=596, Y(ref)=724, X(size)=90, and Y(size)=90. It should be noted that, until updated RFB information has been sent to the CDS 130, there will be no change in the appearance of the VNC image widget depicted on the local display unit 180 as shown in FIG. 10A.

In response to receiving the second message, the VNC server 0002 may generate and send data representative of a server-to-client message in VNC protocol to the VNC client 0002 providing it with the updated RFB data of either the entire RFB or the limited-area RFB. In response, the VNC client 0002 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 10D is represented in the newly-incorporated pixel data set.

The sequence of events described for FIGS. 10A through 10D may apply to the sequence of FIGS. 10E through 10H. When the cursor's button is pressed in FIG. 10E, the PM 170 may be programmed to capture the surface coordinates of the cursor's location (673, 644) and convert them into layer coordinates (485, 503), where the X(layer)=673−188 and Y(layer)=644−141. Because an interaction with a VNC image widget has occurred, the PM 170 may notify the WMUA 160 of the event and provide the current state of the cursor's button and the layer coordinates of the cursor's event in the notification. In response, the WMUA 160 could forward data representative of the notification to the VNC client 0002 which, in turn, could generate and send two client-to-server messages in VNC protocol to the VNC server 0002 of the remote non-aircraft system 124.

Figure 10G:
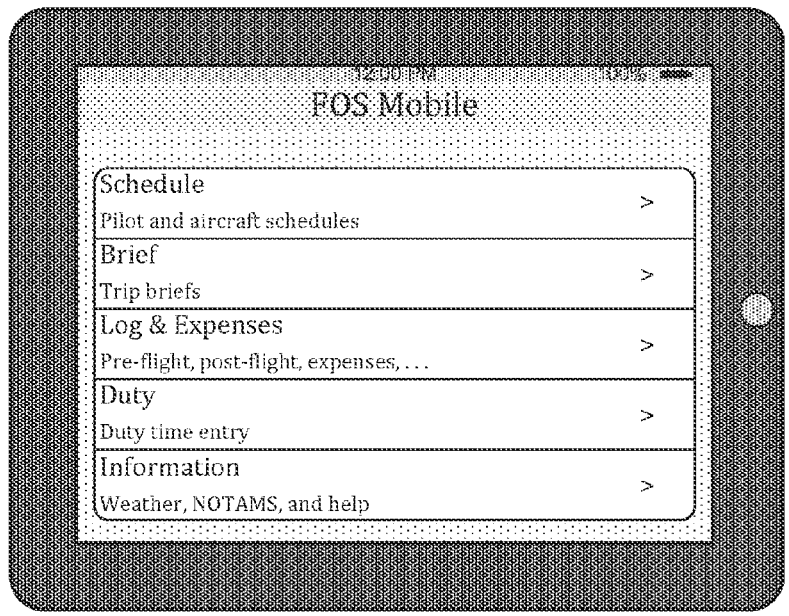
FIG. 10G depicts a second change to the remote image after the first change of FIG. 10F.

Following the same discussion as presented above for the first message, the VNC client 0002 may generate and send data representative of a client-to-server message to the VNC server 0002 notifying it of the current state of the cursor's button (i.e., pressed) and the event location of the cursor. As this message is received by the VNC server 0002, the remote non-aircraft system 124 may respond as if personnel had pressed the surface at given location (485, 503) of the remote display unit 126; that is, the remote non-aircraft system 124 may respond as if personnel had manually selected the "H" interactive widget on the remote display unit 126. This response is indicated in FIG. 1 OF by a change of appearance of "H" interactive widget followed by the appearance of a main menu of FOS MOBILE™ as shown in FIG. 10G.

Following the same discussion as presented above for the second message, the VNC client 0002 may generate and send a client-to-server request comprised of data representative of a request for updated RFB information. In one embodiment, information about the entire RFB may be requested. In another embodiment, information about a limited area of the RFB may be requested when a map of the interactive widgets of the remote display has been made available to the PM 170 as a cross-reference. As shown in the map table of FIG. 8D, layer coordinates (485, 503) fall within the area of position 8 which corresponds to the "H" interactive widget. After referring to the table, the request for a limited area of the RFB may correspond to X(ref)=467, Y(ref)=485, X(size)=90, and Y(size)=90. It should be noted that, until updated RFB information has been sent to the CDS 130, there will be no change in the appearance of the VNC image widget depicted on the local display unit 180 as shown in FIG. 10E.

Figure 10H:
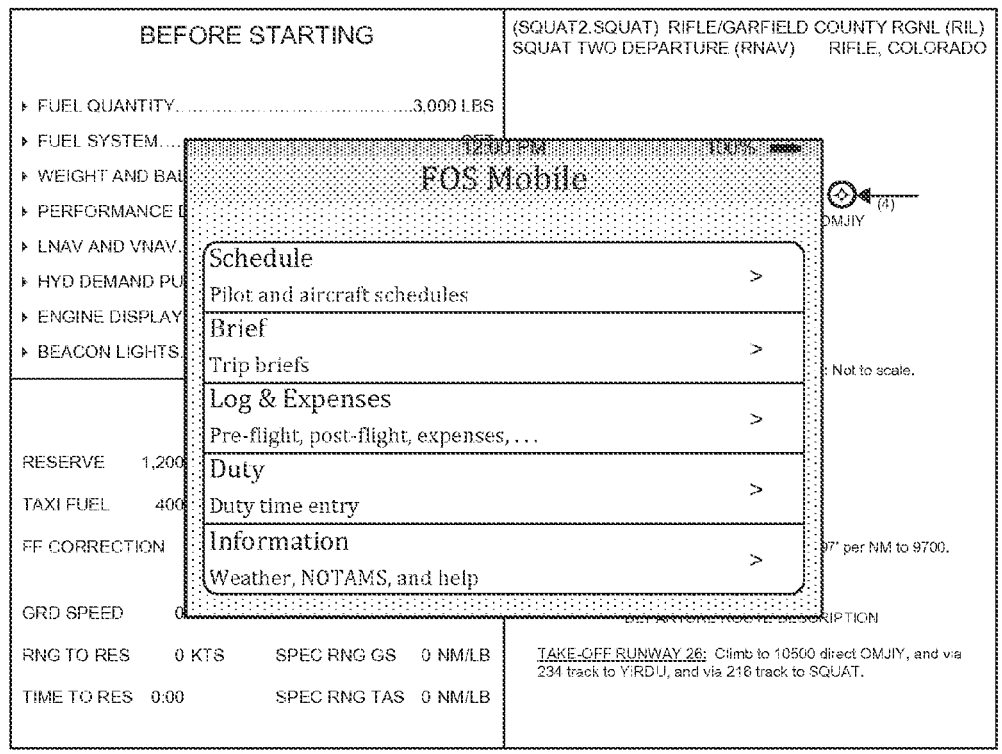
FIG. 10H depicts a change to the local image corresponding to the change of FIG. 10G.

In response to receiving the second message, the VNC server 0002 may generate and send data representative of a server-to-client message in VNC protocol to the VNC client 0002 providing it with the updated RFB data of either the entire RFB or the limited-area RFB. In response, the VNC client 0002 could forward the updated RFB data to the WMUA 160. In response, the WMUA 160 could generate and send updated VNC image widget data corresponding to the RFB data to the PM 170. In response, the PM 170 could incorporate the updated VNC image widget data into the existing pixel data set, such that a VNC image widget indicative of the remote image as shown in FIG. 10HD is represented in the newly-incorporated pixel data set.

It should be noted that, although the remote non-aircraft system 124 responded to pressing of the cursor's button, a manufacturer and/or end-user could have configured the remote non-aircraft system 124 to respond when the cursor's button has been released and not when it's been pressed. In such configuration, the current state of the cursor's button in the first message generated by the WMUA 160 could have corresponded to the releasing of the cursor's button instead of the pressing of the cursor's button. Alternatively, an additional message corresponding to the releasing of the cursor's button could have been generated by the WMUA 160 in sequence after the first message but before the second message.

Although it will not be discussed herein, the embodiments of FIGS. 8A through 10H are not limited to the exemplary display surface format of FIG. 2B but apply equally to other display surface formats. Following the same discussion as presented above for FIGS. 6A through 7C. The simultaneous depiction of images facilitated by the use of the ARINC 661 interface protocol between the CDS 130 and the remote aircraft system 120-1 simultaneously with the use of the VNC interface protocol between the CDS 130 and remote non-aircraft system 124.

It should be noted that the methods described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limited to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system for incorporating Virtual Network Computing ("VNC") into a cockpit display system, such system comprising:
   a VNC server of a non-aircraft system;
   at least one first user application;
   a second user application;
   a pilot input device; and
   a cockpit display system comprised of
      a processing module configured to
         establish a pixel data set representative of a first image, where such first image is comprised of at least one non-VNC widget, and each non-VNC widget is based upon corresponding non-VNC widget data from at least one first user application,
         receive first input data from the pilot input device, where such first input data corresponds to a request to display a second image,
         generate first data in response to the first input data, where such first data is representative of the request to display a second image,
         send the first data to the second user application, such that
         a VNC client of the second user application is configured to
            generate second data, where
               such second data is comprised of a request for remote frame buffer data of the second image,
            send the second data to the VNC server of a non-aircraft system,
            receive third data from the VNC server of a non-aircraft system, where
               such third data is responsive to the request for remote frame buffer data and is comprised of remote frame buffer data of the second image, and
            send fourth data responsive to the first data, where
               such fourth data is comprised of first VNC image widget data generated from the third data,
         receive the fourth data, and
         incorporate the fourth data into the pixel data set.

2. The system of claim 1, wherein
   a protocol of the first data and the fourth data is a protocol established by an aviation-industry standard, and
   a protocol of the second data and the third data is a protocol established for a VNC system.

3. The system of claim 1, wherein
   the processing module is further configured to
      activate a layer to which the VNC image widget is assigned, such that
         the request to display a second image represented in the first data is comprised of a notice of layer activation, and
         the first VNC image widget data is representative of VNC image widget parameters and a request to activate the visibility of the layer.

4. The system of claim 1, wherein
   the processing module is further configured to
      provide the pixel data set to a display unit, and
   the cockpit display system is further comprised of
      at least one display unit configured to
         present the image represented in the pixel data set.

5. The system of claim 1, wherein the cockpit display system incorporates at least one of the following: the VNC server of a non-aircraft system, at least one first user application, the second user application, and the pilot input device.

6. The system of claim 1, wherein
   the processing module is further configured to
      receive second input data from the pilot input device, where such second input data corresponds to a VNC image widget and includes location information of the event,
      generate fifth data in response to the second input data, where such fifth data is representative of both the location information and a state of the VNC image widget event, send the fifth data to the second user application, such
   that the VNC client is further configured to
   generate sixth data, where such sixth data is comprised of
      a notification of the location information and the state, and
      a request for updated remote frame buffer data of the second image, send the sixth data to the VNC server,
   receive seventh data from the VNC server, where such seventh data is responsive to the request for updated remote frame buffer data and is comprised of updated remote frame buffer data of the second image, and
   send eighth data responsive to the fifth data, where such eighth data is updated VNC image widget data generated from the seventh data,
   receive the eighth data, and
   incorporate the eighth data into the pixel data set.
7. The system of claim 6, wherein
a protocol of the fifth data and the eighth data is a protocol established by an aviation-industry standard, and
a protocol of the sixth data and the seventh data is a protocol established for a VNC system.
8. The system of claim 6, wherein
the location information of the second input data corresponds to the location coordinates of the display unit surface, and
the location information of the sixth data corresponds to the location coordinates of the VNC image.
9. A system for controlling a non-aircraft system with a cockpit display system incorporating Virtual Network Computing ("VNC"), such system comprising:
a VNC server of a non-aircraft system;
a user application;
a pilot input device;
a display surface format comprised of
   at least one layer to which at least one non-VNC widget is assigned, and
   at least one layer to which at least one VNC image widget is assigned; and
a cockpit display system comprised of
   the processing module configured to
      establish a pixel data set representative of a first image, where such first image is comprised of at least one VNC image widget,
      receive first input data from the pilot input device, where such first input data corresponds to a VNC image widget event and includes location information of the event,
      generate first data in response to the first input data, where such first data is representative of both the location information and a state of the VNC image widget event,
      send the first data to the user application, such that a VNC client of the user application is configured to
         generate second data, where such second data is comprised of
            a notification of the location information and the state, and
            a request for updated remote frame buffer data of the VNC image corresponding to the VNC image widget,
         send the second data to the VNC server,
         receive third data from the VNC server, where such third data is responsive to the request for updated remote frame buffer data and is comprised of updated remote frame buffer data of the VNC image corresponding to the VNC image widget, and
         send fourth data responsive to the first data, where such fourth data is comprised of updated VNC image widget data generated from the third data,
      receive the fourth data, and
      incorporate the fourth data into the pixel data set.
10. The system of claim 9, wherein
the non-VNC widget and the VNC image widget are assigned to the same layer,
a protocol of the first data and the fourth data is a protocol established by an aviation-industry standard, and
a protocol of the second data and the third data is a protocol established for a VNC system.
11. The system of claim 9, wherein
the location information of the first input data corresponds to the location coordinates of the display unit surface, and
the location information of the second data corresponds to the location coordinates of the VNC image.
12. The system of claim 9, wherein
the processing module is further configured to
   provide the pixel data set to a display unit, and
the cockpit display system is further comprised of
   at least one display unit configured to
      present the image represented in the pixel data set.
13. The system of claim 9, wherein the cockpit display system incorporates at least one of the following: the VNC server of a non-aircraft system, the user application, the pilot input device, and the display surface format.
14. A method for incorporating Virtual Network Computing ("VNC") into a cockpit display system, such method comprising:
   establishing a pixel data set representative of a first image, where
      such first image is comprised of at least one non-VNC widget, and
      each non-VNC widget is based upon corresponding non-VNC widget data from at least one first user application;
   receiving first input data from a pilot input device, where such first input data corresponds to a request to display a second image;
   generating first data in response to the first input data, where such first data is representative of the request to display a second image;
   sending the first data to a second user application, such that a VNC client of the second user application is configured to
      generate second data, where such second data is comprised of a request for remote frame buffer data of the second image,
      send the second data to a VNC server of a non-aircraft system,
      receive third data from the VNC server of a non-aircraft system, where such third data is responsive to the request for remote frame buffer data and is comprised of remote frame buffer data of the second image, and
      send fourth data responsive to the first data, where such fourth data is comprised of first VNC image widget data generated from the third data;
   receiving the fourth data; and
   incorporating the fourth data into the pixel data set.

15. The method of claim 14, wherein
- a protocol of the first data and the fourth data is a protocol established by an aviation-industry standard, and
- a protocol of the second data and the third data is a protocol established for a VNC system.

16. The method of claim 14, further comprising:
- activating a layer to which the VNC image widget is assigned, such that
  - the request to display a second image represented in the first data is comprised of a notice of layer activation, and
  - the first VNC image widget data is representative of VNC image widget parameters and a request to activate the visibility of the layer.

17. The method of claim 14, further comprising:
- providing the pixel data set to a display unit, whereby
  - the image represented in the pixel data set is presented by the display unit.

18. The method of claim 14, further comprising:
- receiving second input data from the pilot input device, where such second input data corresponds to a VNC image widget event and includes location information of the event;
- generating fifth data in response to the second input data, where such fifth data is representative of both the location information and a state of the VNC image widget event;
- sending the fifth data to the second user application, such that the VNC client is further configured to
  - generate sixth data, where such sixth data is comprised of
    - a notification of the location information and the state, and
    - a request updated remote frame buffer data of the second image,
  - send the sixth data to the VNC server,
  - receive seventh data from the VNC server, where such seventh data is responsive to the request for updated remote frame buffer data and is comprised of updated remote frame buffer data of the second image, and
  - send eighth data responsive to the fifth data, where such eighth data is updated VNC image widget data generated from the seventh data,
- receiving the eighth data; and
- incorporating the eighth data into the pixel data set.

19. The method of claim 18, wherein
- a protocol of the fifth data and the eighth data is a protocol established by an aviation-industry standard, and
- a protocol of the sixth data and the seventh data is a protocol established for a VNC system.

20. The method of claim 18, wherein
- the location information of the second input data corresponds to the location coordinates of the display unit surface, and
- the location information of the sixth data corresponds to the location coordinates of the VNC image.

21. A method for controlling a non-aircraft system with a cockpit display system incorporating Virtual Network Computing ("VNC"), such method comprising:
- establishing a pixel data set representative of a first image, where such first image is comprised of at least one VNC image widget and based upon a display surface format comprised of
  - at least one layer to which at least one non-VNC widget is assigned, and
  - at least one layer to which at least one VNC image widget is assigned;
- receiving first input data from a pilot input device, where such first input data corresponds to a VNC image widget event and includes location information of the event;
- generating first data in response to the first input data, where such first data is representative of both the location information and a state of the VNC image widget event;
- sending the first data to a user application, such that a VNC client of the user application is configured to
  - generate second data, where such second data is comprised of
    - a notification of the location information and the state, and
    - a request for updated remote frame buffer data of the VNC image corresponding to the VNC image widget,
  - send the second data to a VNC server of a non-aircraft system,
  - receive third data from the VNC server, where such third data is responsive to the request for updated remote frame buffer data and is comprised of updated remote frame buffer data of the VNC image corresponding to the VNC image widget, and
  - send fourth data responsive to the first data, where such fourth data is comprised of updated VNC image widget data generated from the third data;
- receiving the fourth data; and
- incorporating the fourth data into the pixel data set.

22. The method of claim 21, wherein
- the non-VNC widget and the VNC image widget are assigned to the same layer,
- a protocol of the first data and the fourth data is a protocol established by an aviation-industry standard, and
- a protocol of the second data and the third data is a protocol established for a VNC system.

23. The method of claim 21, wherein
- the location information of the first input data corresponds to the location coordinates of the display unit surface, and
- the location information of the second data corresponds to the location coordinates of the VNC image.

24. The method of claim 21, further comprising:
- providing the pixel data set to a display unit, whereby
  - the image represented in the pixel data set is presented by the display unit.

* * * * *